Feb. 2, 1954 T. J. JUDGE 2,668,231

CODED TRACK CIRCUIT SIGNALING SYSTEM

Filed Nov. 20, 1948 8 Sheets-Sheet 1

INVENTOR.
BY T. J. Judge,
Neil D. Preston,
his ATTORNEY

Feb. 2, 1954

T. J. JUDGE 2,668,231

CODED TRACK CIRCUIT SIGNALING SYSTEM

Filed Nov. 20, 1948

8 Sheets-Sheet 2

INVENTOR.

BY T. J. Judge,

Neil W. Preston, his ATTORNEY

Feb. 2, 1954 T. J. JUDGE 2,668,231

CODED TRACK CIRCUIT SIGNALING SYSTEM

Filed Nov. 20, 1948 8 Sheets-Sheet 3

INVENTOR.
T. J. Judge,
BY Neil W. Preston,
his ATTORNEY

INVENTOR.
BY T. J. Judge,
Neil W. Preston,
his ATTORNEY

Feb. 2, 1954 T. J. JUDGE 2,668,231

CODED TRACK CIRCUIT SIGNALING SYSTEM

Filed Nov. 20, 1948

8 Sheets-Sheet 5

INVENTOR.

T. J. Judge,

BY Neil W. Preston, his ATTORNEY

Feb. 2, 1954 T. J. JUDGE 2,668,231
CODED TRACK CIRCUIT SIGNALING SYSTEM
Filed Nov. 20, 1948 8 Sheets-Sheet 6

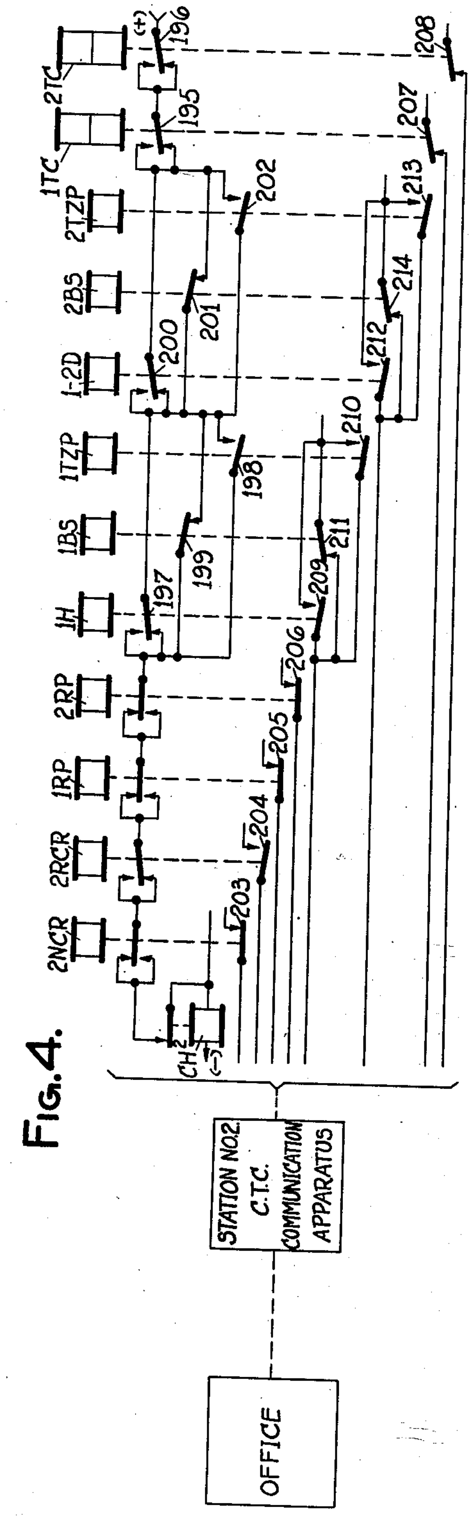

FIG. 4.

FIG. 5.

CONTROL CODE CHART

| USE OF CODE | CODE NO. | CHARACTERS OF CONTROL CODES NO.4. | NO.5. | NO.6. | NO.7. | NO.8. |
|---|---|---|---|---|---|---|
| SWITCH NORMAL | 1 | LS | | | | |
| SWITCH REVERSE | 2 | SL | | | | |
| PICK UP RELAY ETZ | 3 | | LS | | | |
| RELEASE RELAY ETZ | 4 | | SL | | | |
| PICK UP RELAY WTZ | 5 | | | LS | | |
| RELEASE RELAY WTZ | 6 | | | SL | | |
| SIGNAL RIGHT | 7 | | | | LS | SL |
| SIGNAL LEFT | 8 | | | | SL | LS |
| SIGNAL STOP | 9 | | | | LS | LS |

LS=LONG FOLLOWED BY SHORT
SL=SHORT FOLLOWED BY LONG

INVENTOR.
T. J. Judge,
BY Neil W. Preston,
his ATTORNEY

INVENTOR.
T. J. Judge,
BY Neil M. Preston,
his ATTORNEY

Feb. 2, 1954

T. J. JUDGE 2,668,231

CODED TRACK CIRCUIT SIGNALING SYSTEM

Filed Nov. 20, 1948

8 Sheets-Sheet 8

INVENTOR.
T. J. Judge,
BY
Neil W. Preston,
his ATTORNEY

Patented Feb. 2, 1954

2,668,231

UNITED STATES PATENT OFFICE 2,668,231

CODED TRACK CIRCUIT SIGNALING SYSTEM

Thomas J. Judge, Rochester, N. Y., assignor to General Railway Signal Company, Rochester, N. Y.

Application November 20, 1948, Serial No. 61,215

10 Claims. (Cl. 246—3)

This invention relates to centralized traffic control signalling systems for single track railroads and it more particularly pertains to centralized traffic control systems, commonly known as CTC systems, wherein normally inactive coded track circuits are used to govern the clearing of signals in accordance with traffic conditions.

When coded track circuits are employed in a CTC system linking a control office and respective field stations for single track railroads, it is necessary to govern the direction of track circuit code transmission in accordance with the direction of traffic to be established. A system of this general character must guard against code being inadvertently taken away from signals governing passage of a train by attempting to clear other signals, and the time of shutting down the coding must be properly governed to prevent the possibility of taking the code away from a train when a normally shut down coded track circuit system is employed. Systems of this general character are disclosed in my prior patents, Patent No. 2,635,182 dated April 14, 1953, and Patent No. 2,617,014 dated November 4, 1952; and the present invention is to be considered as providing improvements in systems of this general character.

An object of the present invention is to provide a CTC system of the normally shut down coded track circuit type wherein the initiation of coding and the direction of code transmission is automatically established, without the use of traffic direction levers in response to the communication of each control from the control office to a field station for the clearing of a signal.

Another object of the present invention is to cause the reception of a signal control in the field for clearing a signal to apply steady energization through the track rails of the block in advance of the signal for which the signal control has been transmitted from the office, such steady energization being maintained until reception of a particular control communicated from the control office for its removal.

Another object of the present invention is to provide receiving means at each field station distinctively conditioned by the reception of steady energy through the track rails, and effective to transmit an indication to the control office of such reception and of the direction from which the steady energy is received.

Another object of the present invention is to automatically transmit a control from the control office to one field station in response to the reception of an indication that steady energy is received at the adjoining field station, and thereby effect the removal of steady energy from the track rails.

Another object of the present invention is to provide means associated with the trackway extending in each direction from each field station effective in responsive to the cessation of steady energy to initiate code transmission in the direction from which the steady energy has been received to thereby establish track circuit code and effect the clearing of a signal that has been designated to be cleared by an operator at the control office.

Another object of the present invention is to automatically shut down the coding after passage of a train through a block by applying steady energy feeding in the direction of train movement after the block has become unoccupied, and thereby rendering the track circuit code transmitters in that block inactive.

Another object of the present invention is to provide means effective when a code transmitter is rendered inactive at a field station to transmit a distinctive indication to the control office causing the control office to automatically transmit a control to remove the steady energy at the field station where it has been initially applied for rendering the code transmitters inactive, and thereby restore the normally deenergized condition of the coded track circuits.

Another object of the present invention is to accomplish the above described objects without the use of traffic designation levels and without the operator of the control machine being required to designate other than the usual switch and signal controls desired to be transmitted.

Other objects, purposes, and characteristic features of the present invention will be in part obvious from the accompanying drawings, and in part pointed out hereinafter in the specification.

In describing the invention in detail, reference will be made to the accompanying drawings in which those parts having similar features and functions are designated throughout the several illustrations by like letter reference characters which are generally made distinctive by reason of preceding numerals indicative of the location of the signals or track switches with which such parts are associated, and in which:

Fig. 1 illustrates the control office apparatus for use in communication with typical field stations according to the present invention;

Figs. 2A, 2B, and 2C when placed side by side respectively, illustrate the stretch of track constituting a block extending between two passing sidings of this embodiment of the present invention together with coded track circuit means and office controlled means for governing the switches and signals;

Fig. 4 illustrates means for communicating indications from a typical field station to the control office;

Fig. 5 is a control code chart showing the code characters employed in this embodiment of the present invention for the communication of respective controls from the control office to any one of the field stations.

The embodiment chosen for the disclosure of the present invention has been particularly adapted to show typical conditions to be encountered in practice with the purpose of illustrating principles involved that may be applied to extended track layouts, rather than limiting the invention to the simple embodiment herein disclosed. Schematic circuit diagrams have been used in the conventional manner, rather than attempting to illustrate the actual construction and arrangement of parts that would be employed in practice. The symbols (+) and (—) are employed to indicate the positive and negative terminals respectively of suitable batteries or other sources of direct current, and the symbol (CL) has been used to designate the center tap of a battery used for polarized energization of magnetic stick relays. The symbols (LS) and (SL) are used to indicate code characters transmitted over the communication system, each character comprising a combination of a long and short period, the symbol (LS) representing a code character having long and short periods respectively, and the symbol (SL) representing a code character having respectively short and long periods.

Figure 2A:
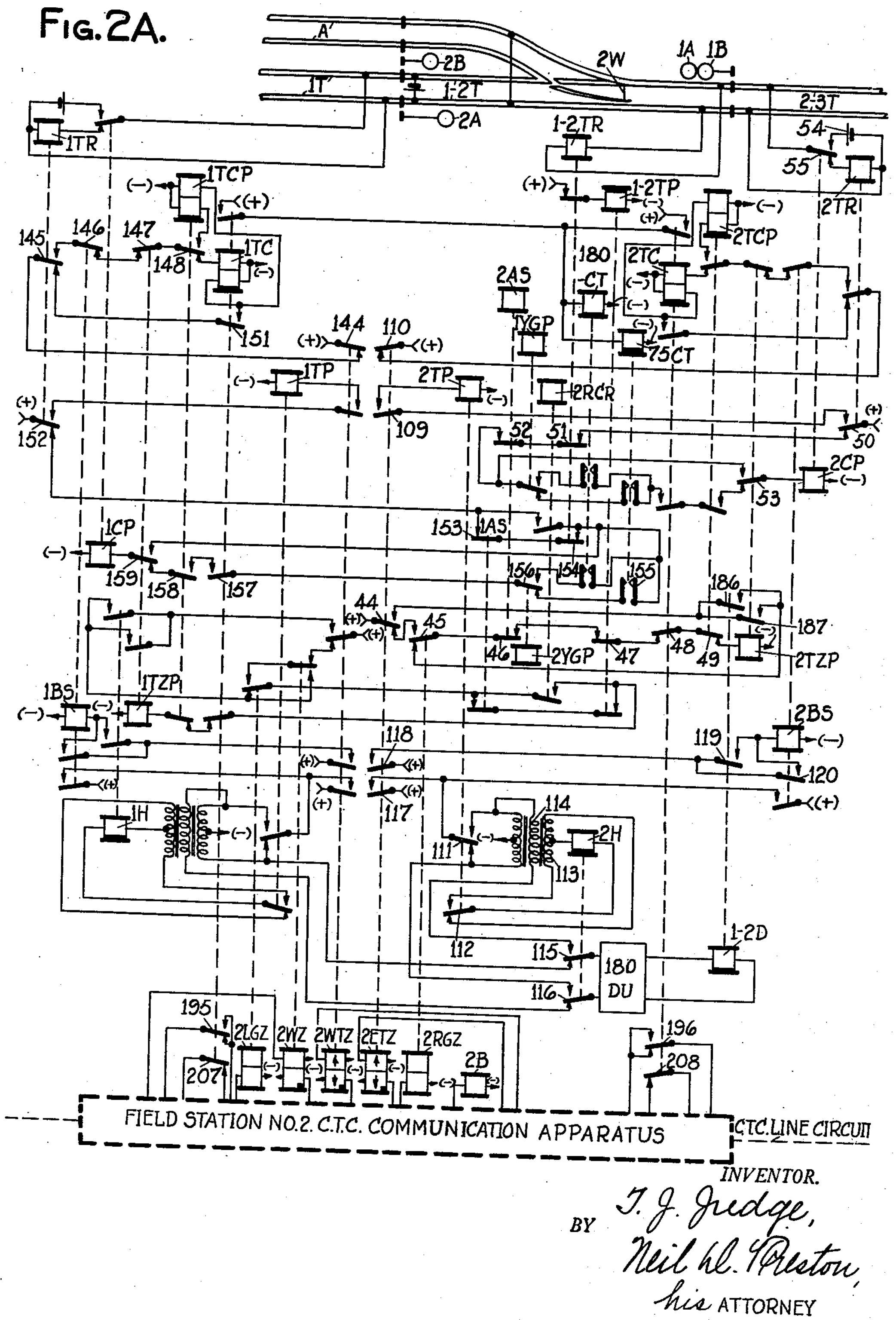

The trackway for which this embodiment of the present invention is provided comprises a main stretch of single track having passing sidings associated therewith, such stretch of track being divided into the usual track sections to provide a plurality of track sections constituting a block extending between passing sidings A and B. With reference to Fig. 2A, a passing siding A is illustrated as being connected at its right-hand end to the main track by the track switch 2W, and similarly in Fig. 2C, the left-hand end of the passing siding B is illustrated as being connected to the main track by a track switch 3W.

Figure 2B:
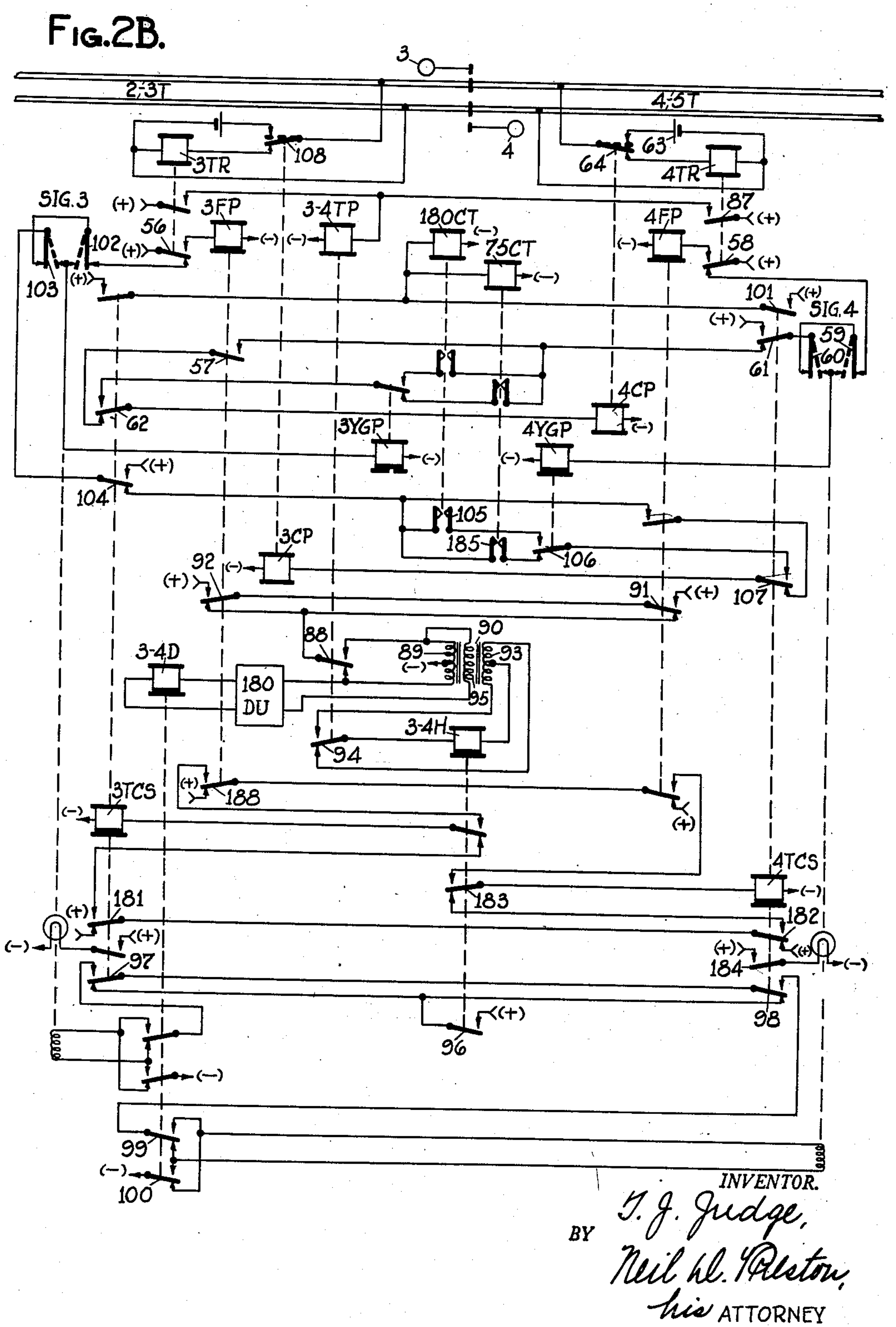
Figure 2C:
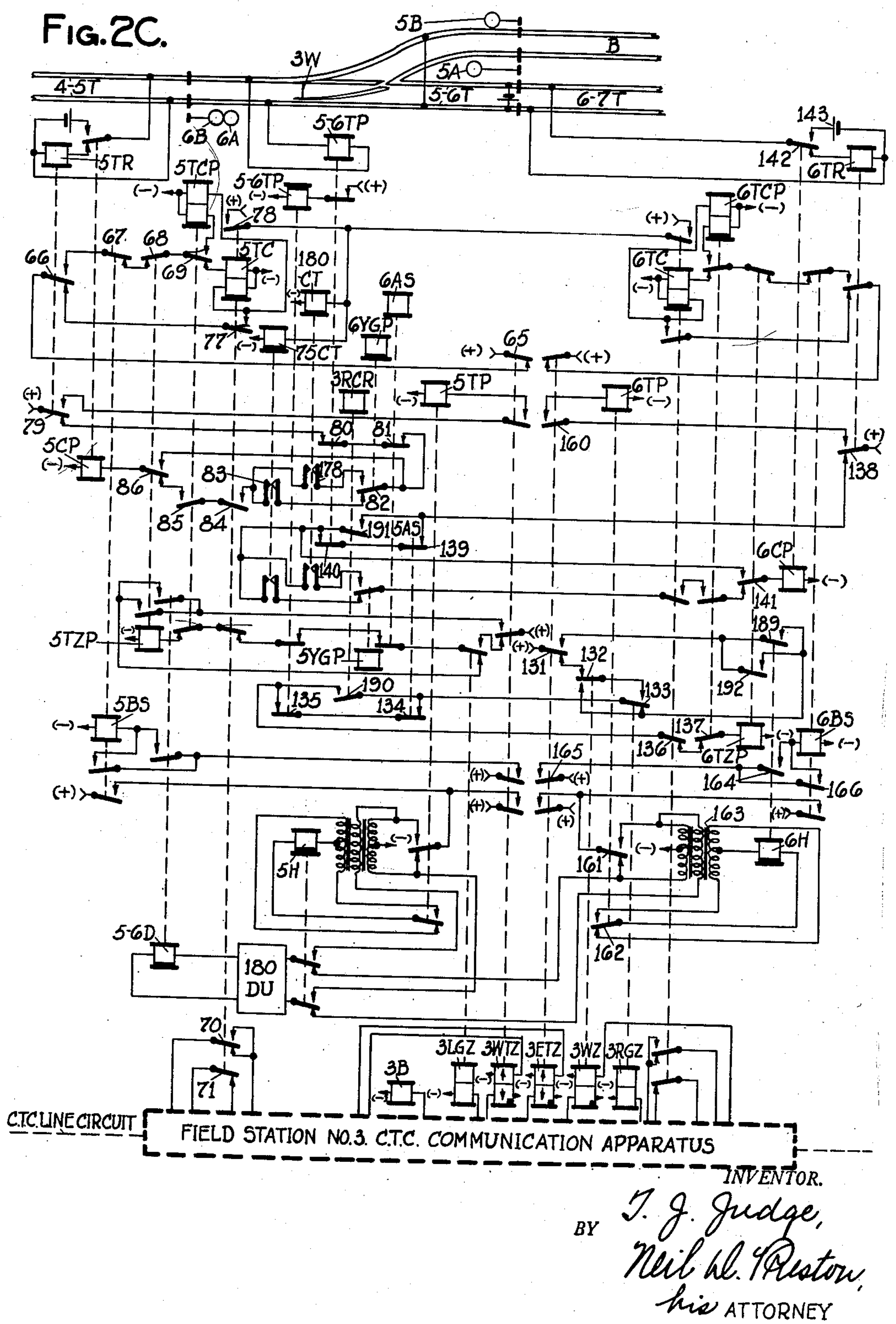

The signals are arranged at the ends of the passing sidings in the usual manner to provide a short detector or OS track section for the track switch at each end of each passing siding. Thus the detector track section 1—2T, is provided for the right-hand end of the passing siding illustrated in Fig. 2A, and the detector track section 5—6T is provided for the track switch 3W at the left-hand end of the passing siding as illustrated in Fig. 2C. These detector track sections are of the conventional steadily energized type, and the power operation of the track switches included in the detector track sections at the respective ends of the passing siding can be provided by suitable power switch machines controlled as shown, for example, in Fig. 3.

Signals are provided at the ends of the passing sidings for governing traffic in both directions, such signals being normally at stop, and subject to manual control by an operator at the control office in accordance with the communication of controls for such signals to respective field stations by a code communication system such as is disclosed in detail, for example, in the patent to W. D. Hailes et al., Patent No. 2,399,734, dated May 7, 1946.

Although this embodiment of the present invention has been particularly adapted to employ the centralized traffic control code communication system disclosed in the above mentioned Hailes et al. patent, it is to be understood that other types of code communication systems could be readily employed by those skilled in the art, such for example, as the code communication system disclosed in the patent to Judge et al., Patent No. 2,082,544, dated June 1, 1937.

The entering signals 1A and 1B (see Fig. 2A) are provided at the right-hand end of the passing siding A for governing westbound traffic (to the left) through the track switch 2W and the detector track section 1—2T, and the head-block signals 2A and 2B are provided for governing eastbound traffic (to the right) through that detector track section. At the left-hand end of the passing siding B (see Fig. 2C) the signals 6A and 6B are provided for governing eastbound traffic through the OS track section 5—6T, and the signals 5A and 5B are provided for governing westbound traffic through this OS track section. Signals 3 and 4 are illustrated in Fig. 2B as being double intermediate signals, signal 3 being provided for governing westbound traffic through the track section 2—3T, and the signal 4 being provided for governing eastbound traffic through the track section 4—5T.

The signals for this embodiment of the present invention are illustrated as being of the searchlight type and such signals can be of the general character shown in the patent to O. S. Field, Patent No. 2,239,316, dated April 22, 1941. It is to be understood, however, that other types of signals such as semaphore, position light, and signals having individual color light units may be employed in accordance with the requirements of practice.

Each of the track sections in the stretch of track constituting a block extending between the passing sidings A and B has a coded track circuit which comprises a track battery and a code following track relay TR at each end of the track section. For the purpose of obtaining the best operating conditions of the code following track relays, it is desired that each of such relays have a polar magnetic structure with a spring biased armature so arranged as to cause the relay armature to be biased to a deenergized position from which it can be moved only upon energization of the relay windings with a particular polarity.

A code transmitter relay CP is provided at each end of each of the coded track circuits for the transmission of code pulses formed by suitable pulse forming means such, for example, as the oscillators 75CT and 180CT which are adapted to form pulses at respective 75 and 180 per minute rates. A suitable oscillator of this type is disclosed in the patent to O. S. Field, Patent No. 2,351,588, dated June 20, 1944.

Decoding apparatus is provided at each of the signal locations for control of the signals at that location comprising a decoding transformer, a home relay H, and a distant relay D having associated therewith a tuned circuit 180DU so as to render the relay D responsive only to reception of the 180 code rate.

Relays TC and TCP are associated with the respective ends of coded track circuits at each end of each passing siding for rendering the track circuit code transmitter at that location selectively active or inactive in response to the reception of steady energization in the track rails. The relay TC of this combination is effective to communicate an indication to the office of a change in its condition, and thereby render an automatic initiation at the office of the transmission of a control to the field for the removal of the steady energization that has caused the change in the corresponding TC relay at the adjoining field station.

At the control office (see Fig. 1) a suitable CTC machine is provided comprising a panel having a track diagram disposed thereon corresponding to the track layout for which this embodiment of the present invention is provided, and having various switch and signal control levers and relays provided for purposes of communication of switch and signal controls to the respective field stations substantially comparable to apparatus specifically described in the above mentioned patent to W. D. Hailes et al., Patent No. 2,399,734, dated May 7, 1946. For convenience in identifying the apparatus employed in this embodiment of the present invention with corresponding aparatus shown in that patent, corresponding letter reference characters for the various relays and control switches have been employed to facilitate reference to such patent for a more detailed description as to their organization and mode of operation.

In addition to the relays CH for initiation of a control cycle for each field station being energized in response to manual designation for a start for that field station, each of the relays CH is also subject to automatic energization for initiating a start in response to the reception of an indication from an adjoining field station that steady energization has been received at that field station from the station for which the relay CH is provided, and thus under these conditions, it is desirable that a cycle of operation be automatically initiated for transmission of a control calling for the removal of the steady energy. Such automatic control of each relay CH is provided by a combination of a relay ETK and a relay ETKP for eastbound traffic and a relay WTK and a relay WTKP for westbound traffic. The relays TK are magnetic stick relays which are conditioned by the reception of indications from the field by the CTC code communication apparatus, while the relays TKP are slow drop away stick repeater relays which are associated with and governed by the associated indication relays TK.

The relays LS and SL are code determining relays which actually determine by their selective energization as to whether the code characters transmitted are respectively (LS) or (SL) characters. It is thus provided that the relays LS and SL are selectively energized during respective control cycles to transmit the control codes formed according to the code chart of Fig. 5.

CTC communication apparatus is provided at the respective field stations which are located at the ends of passing sidings which can be provided according to the Hailes et al. patent, such apparatus at each field station being effective to control application relays LGZ and RGZ (see Figs. 2A and 2C) for clearing signals governing respective westbound (to the left) and eastbound traffic (to the right). A relay B is provided at each field station as an application relay governing restoration to stop of the signals at its associated field station in accordance with a stop control communicated from the control office. East and west direction control relays ETZ and WTZ are provided at each field station for governing the removal of steady energization as fed through the track rails from that field station in accordance with a control automatically communicated from the control office. These relays are of the magnetic stick type so as to stay in their last actuated position until energized with the opposite polarity.

Suitable other indication control apparatus is provided as required both at the respective field stations and at the control office comprising means for indicating on the control machine at the control office various conditions relative to the switches and signals and block occupancy according to the requirements of practice, the magnetic stick relays EBK and WBK being provided at the control office for the governing of block indicator lamps on the track diagram.

Having thus considered the general organization of the apparatus employed in this embodiment of the present invention, consideration will now be given to the specific organization in accordance with its mode of operation under typical operated conditions to be encountered in practice.

OPERATION

*General*

Although reference is to be made to the above mentioned Hailes et al. patent for a more specific consideration of the code communication system that is used for this embodiment of the present invention, it is believed expedient to give some consideration to the general mode of operation of this system in the communication of controls as applied to the present invention, before considering in detail the specific circuit organization that is provided for accomplishing certain parts of this mode of operation.

The general mode of operation in designating controls by the manipulation of signal and switch control levers on the control panel of the control machine is the same as for the conventional CTC system, wherein the machine operator positions the respective switch and signal control levers according to routes desired to be established, and effects the transmission of controls to the respective field stations with which such levers are associated by the actuation of respective start buttons SPB (see Fig. 1) for such stations. In this manner a number of different controls can be designated for transmission, and the circuit organization of the code communication apparatus is such as to cause the transmission of control cycles to the field stations, one cycle of operation for each station, such cycles being transmitted in a particular predetermined order and such order being established by the chain organization (not shown) for the energization of the relays LC, one relay LC being provided for each field station.

Thus the designation of switch and signal control by the positioning of respective switch and signal control levers, and the actuation of the start button for causing the transmission of these controls, is effective to first pick up the relay CH that is associated with the initiation of the control cycle start for that field station, and the picking up of that relay is effective to pick up the associated relay LC when the communication system is available for the transmission of a control cycle to that field station. The picking up of the relay LC under these conditions for a field station is in accordance with the actual setting into operation of the code communication system for the transmission of a control cycle to that particular field station. Thus it is in this manner that a signal control is transmitted to the field for the clearing of a signal in accordance with the manual designation by an operator of the signal desired to be cleared.

Figure 6A:
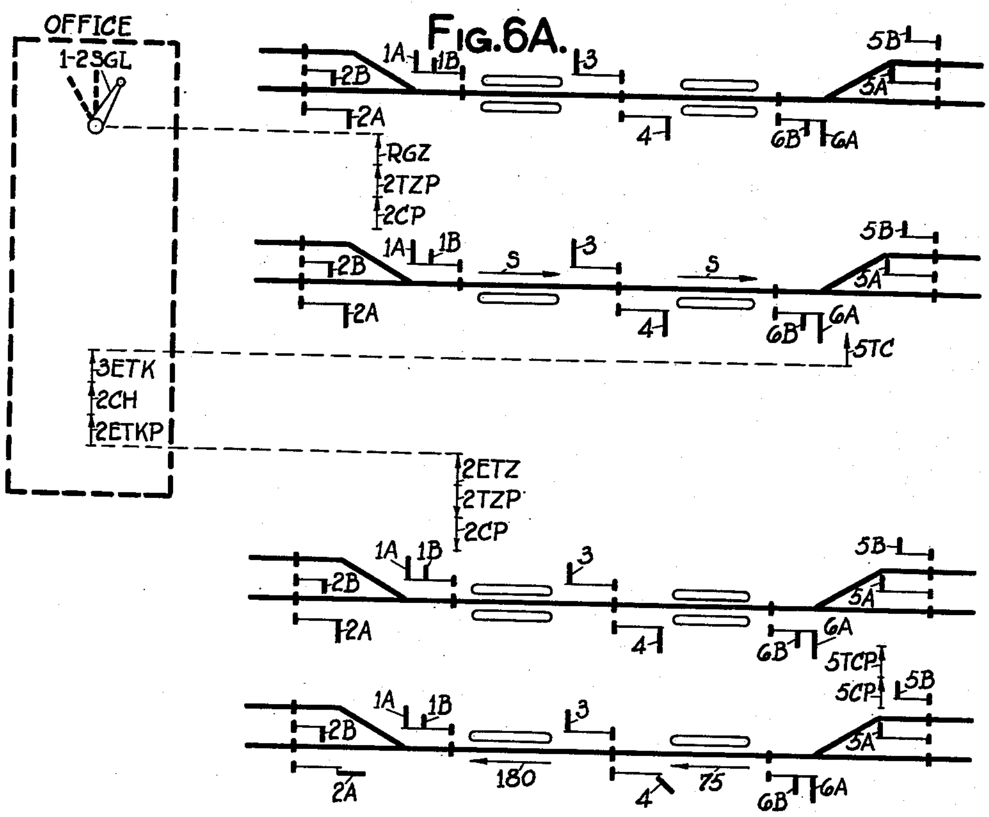
Figs. 6A to 6E inclusive illustrate diagrammatically the conditions of code transmission as they are effected by various conditions during the passage of a train.
Figure 6B:
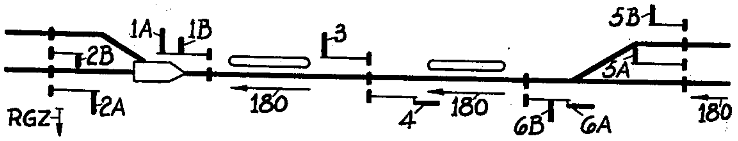

Upon reception of the signal control at the field station, as illustrated by the sequence chart of Fig. 6A, a relay RGZ is picked up for the clearing of a signal (assuming the control for the clearing of a signal governing eastbound traffic), and the picking up of that relay is effective in turn to energize relays TZP and CP so as to apply steady energy to the track rails at that field station to feed through the block from track section to track section to the next field station in advance for the direction of traffic that has been indicated as being desired to be established by the signal designation.

Figure 1:
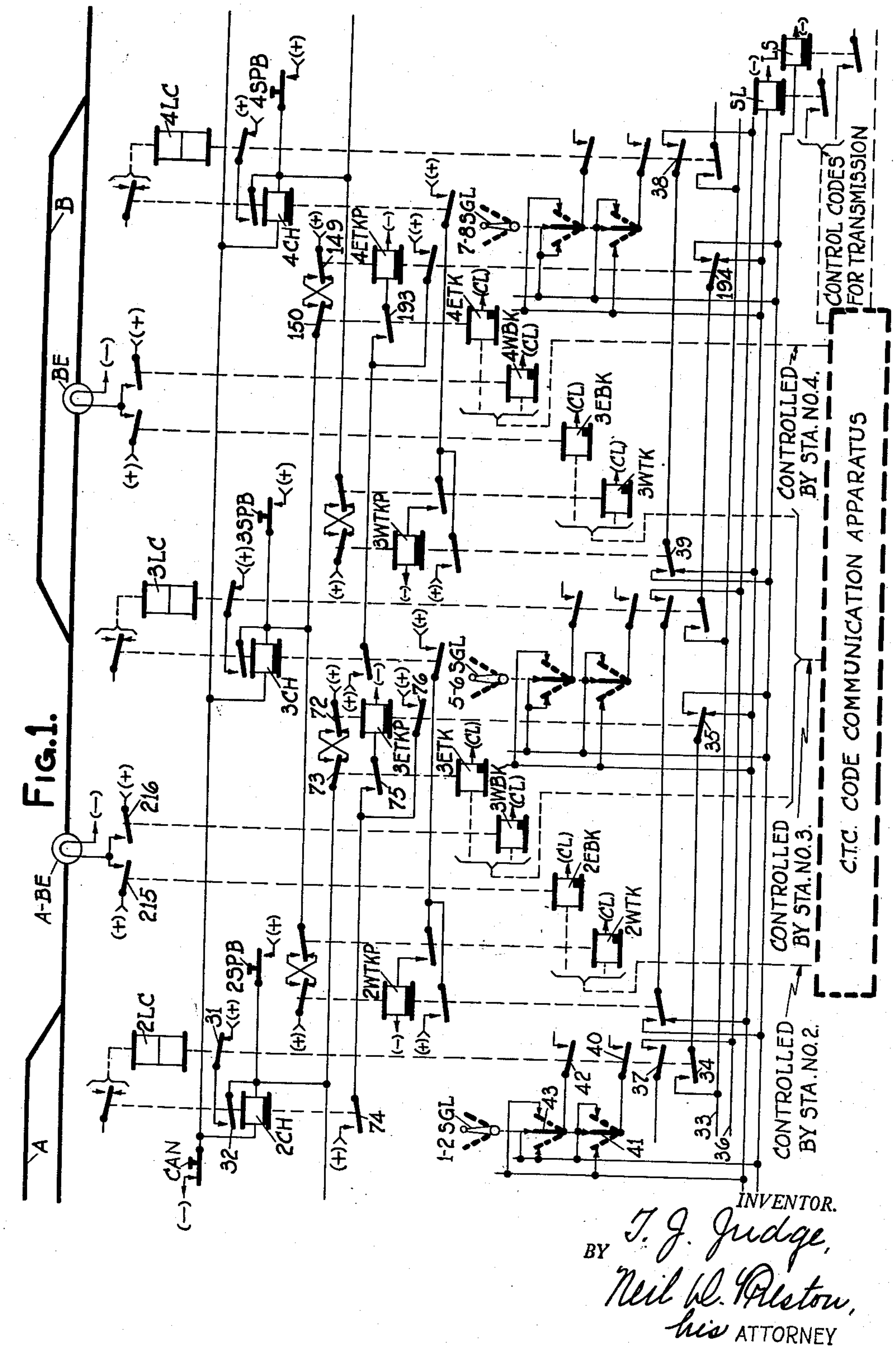

The reception of this condition of steady energization at the next field station is effective to pick up a relay TC, which in turn automatically initiates an indication cycle to transmit an indication to the office that the condition of steady energization has been received. With reference to Fig. 1, the reception of such indication picks up a magnetic stick relay TK and in accordance therewith the same change relay CH is again picked up that was picked up initially for initiating the transmission of the signal control to the field.

Thus there is an automatic initiation of a control cycle during which a control is transmitted to the field station having the signal desired to be cleared which is effective to pick up the relay ETZ at that station, and by picking up that relay, cause the removal of the condition of steady energization from the track rails by the deenergization of the relays TZP and CP at that field station. The steady energy is therefore removed from the block between the respective field stations under consideration, and the removal of such steady energy is effective to initiate the code transmitter at the next field station by the picking up of a relay TCP, and thus the code rate is built up through the respective track sections so that a code at a 180 rate is received at the signal that has been designated to be cleared, and the reception of that code rate effects the clearing of that signal.

Figure 6C:
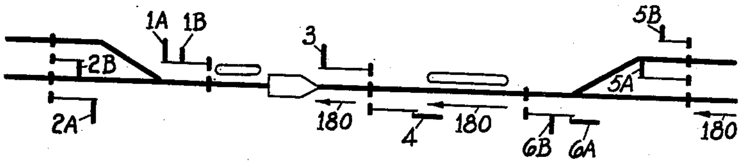
Figures 6D, 6E:
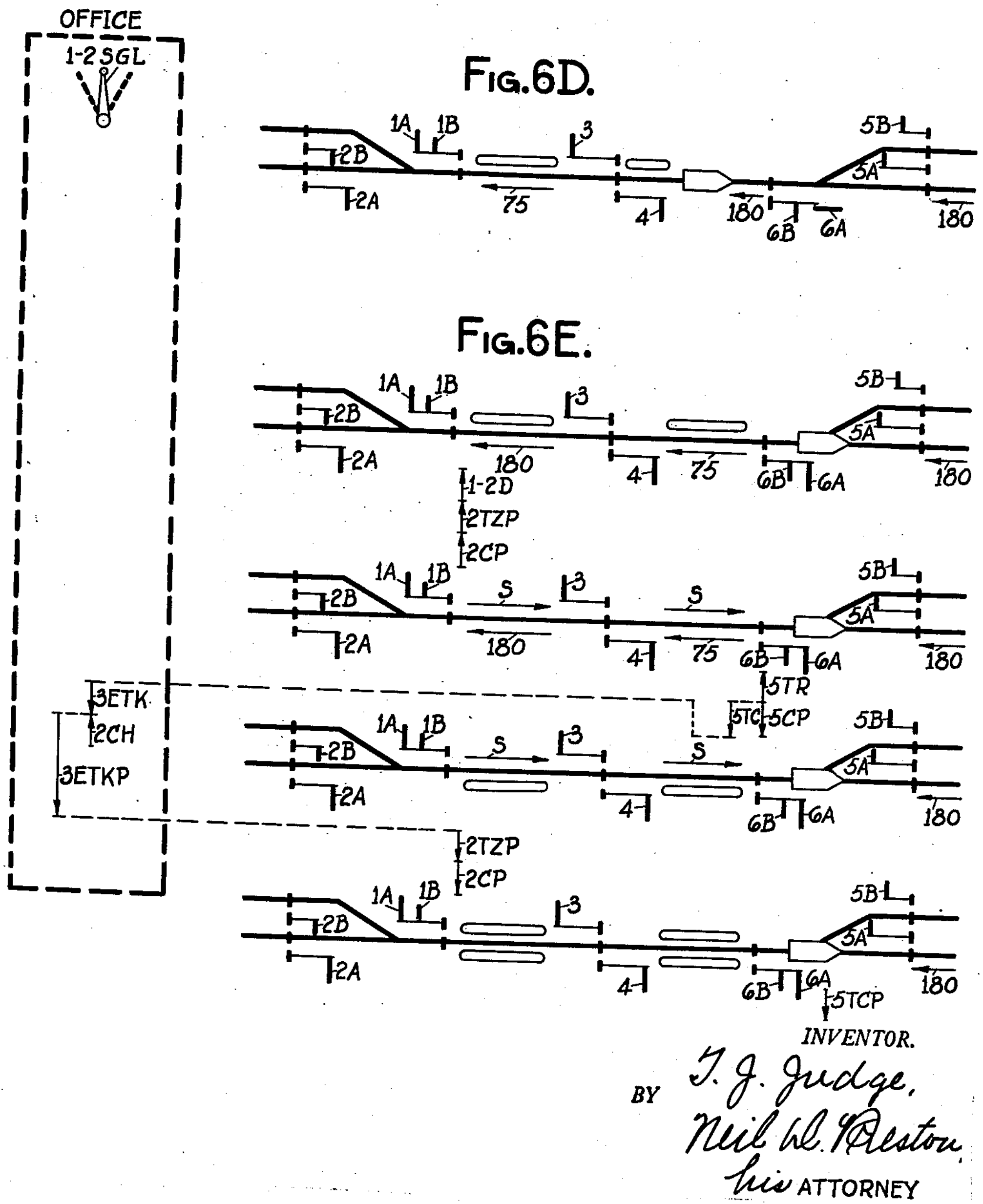

With reference to Fig. 6E, a much similar mode of operation is illustrated diagrammatically whereby shut down of the code transmitters in the rear of a train is accomplished. This operation is entirely automatic, the signal lever governing the signal which has been cleared having been restored to its normal center position by the operator upon his observing indications on the board that the signal has been accepted by a train. It is illustrated in Fig. 6E that the building up of the code rate to a 180 code at the left-hand end of the block illustrated, when the block becomes unoccupied in the rear of a train, is effective to pick up a relay TZP and thus in turn pick up the relay CP at the left-hand end of the block as a means for again applying steady energy to the track rails to effectively buck down the code and cause the cessation of code transmission in the block. This condition of steady energization is maintained until a relay TC is picked up at the next field station in advance, such relay in picking up being effective to initiate transmission of an indication cycle to the control office, and by such indication cycle effect the transmission automatically from the control office of a control to the left-hand end of the block to effect the dropping away of the relays TZP and CP so as to remove the condition of steady energization and thereby to leave the coded track circuits of the block inactive as far as code transmitters are concerned and deenergized, whereby restoration is completed to the normal conditions of the track circuit code apparatus.

*Normal conditions*

The conditions which, for purposes of description of the present invention, are assumed to be normal, are those conditions of the system which exist when the trackway is unoccupied by trains, when the signals are at stop, when no controls are designated for transmission from the control office, and when the track circuits are normally deenergized and the code transmitters are inactive. Under these conditions, the track relays TR for the conventional steadily energized OS track sections are the only track relays that are normally energized, and the approach locking relays AS (see Fig. 3) for the various signals, as well as the signal stop repeater relays RP are normally energized by circuits conventionally employed for relays of this character. Thus the signal stop repeater relay 2RP, for example, is energized through contacts 20, 21, 22 and 23 of signals 2A and 2B respectively because of these signals both being at stop; and by the closure of front contact 24, relay 2RP maintains a stick circuit closed for the approach locking relay 2AS which is also associated with signals 2A and 2B, this circuit extends from (+), including front contact 24 of relay 2RP, front contact 25 of relay 2AS, and winding of relay 2AS, to (−). In a similar manner the relay 1AS, which is associated with the signals 1A and 1B, is maintained picked up by its stick circuit which is dependent for its energization upon the signals 1A and 1B being at stop.

It is assumed that the magnetic stick relays must necessarily assume their last actuated positions, and it is assumed that the normal conditions of such relays are established as illustrated by the last routes set up through the track layout having called for the track switches to be operated to their normal positions. It is also assumed that the signal control levers at the control office for the respective signals have all been actuated to their center positions, corresponding to the stop indication of the associated signals in the field.

Figure 3:
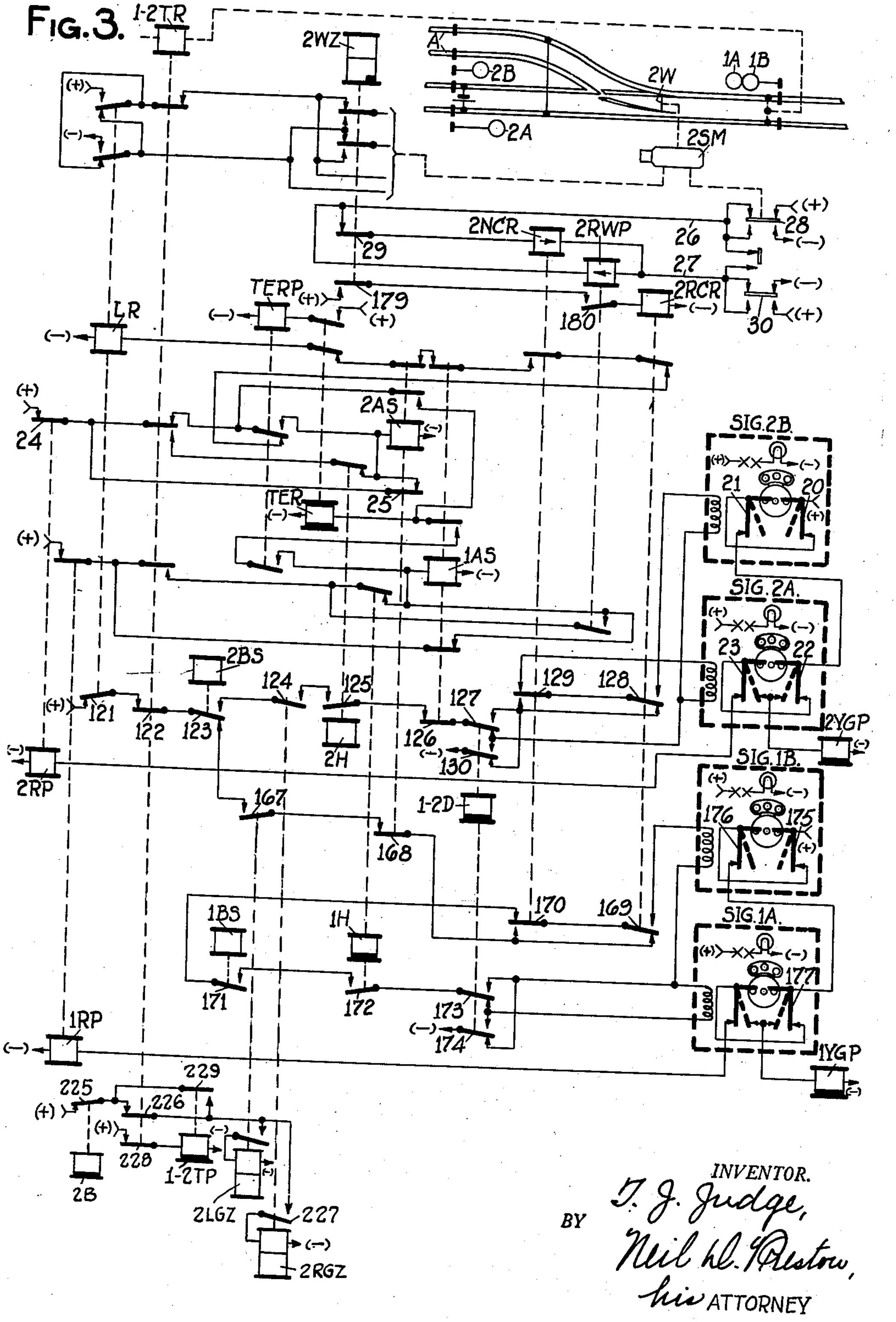
Fig. 3 illustrates typical switch and signal control circuits for one end of a passing siding.

With reference to Fig. 3, the relays 2NCR and 2RCR are respective normal and reverse correspondence relays, of which the relay 2NCR is normally energized in accordance with it being assumed that the track switch 2W is in its normal position. Relay 2RWP is energized, but because of the relays 2NCR and 2RWP being of the biased polar type and being oppositely poled with respect to their common control wires 26 and 27 which extend to the switch machine 2SM, only the relay 2NCR is picked up when the track switch 2W is in its normal position. The circuit by which the relay 2NCR is energized under these conditions extends from (+) including, contact 28 of the detector contact mechanism of switch machine 2SM, front contact 29 of relay 2WZ, winding of relay 2NCR, and contact 30 of the detector mechanism of the switch machine 2SM, to (—).

*Transmission of controls from the control office*

The same general organization for the communication of controls during respective control cycles that is commonly employed in CTC control systems is used whereby a control cycle when transmitted for any particular field station is effective to communicate all controls for office control equipment at that field station. Thus the make up of the control cycle comprises first a station selection portion of the cycle, and secondly a control portion of the cycle for governing the office control devices at the field station that is selected. With reference to Fig. 5, a code chart is shown illustrating the specific code characters employed in this embodiment of the present invention for the communication of controls to any station which is called by the preceding station selection portion of the cycle. Such station selection code is assumed to comprise the first three code characters transmitted. It is thus illustrated that the code character No. 4 is selectively an (LS) or an (SL) character in accordance with whether the track switch at the station that is called is to be operated to its normal or reverse position.

The fifth character transmitted during the cycle is either an (LS) or an (SL) character in accordance with whether a magnetic stick relay ETZ is to be picked up or dropped away at the field station that is called. This relay ETZ when picked up removes steady energization feeding to the right through the track rails so as to permit the initiation of coding for eastbound traffic, and when dropped away, such relay provides for the removal of steady energization which has been used for shutting down the track circuit code transmitters after passage of an eastbound train.

The next code character of the cycle is an (LS) or an (SL) character in accordance with whether a relay WTZ associated with the establishment of eastbound traffic is to be respectively picked up or dropped away, such relay being used for similar purposes as has been described for the relay ETZ for the opposite direction of traffic.

The last two characters of the control code transmitted during a control cycle are used in the conventional manner for signal control purposes for selectively designating the clearing of a signal for traffic to the right, or for traffic to the left, or for restoration of a signal to stop.

To consider the specific circuit organization whereby the above described mode of operation is effective during the control cycle, reference is made to Fig. 1, and it will be assumed that a control cycle is to be transmitted for the clearing of the signal 2A (see Fig. 2A) for governing eastbound traffic into the block extending between the passing sidings A and B. Thus after positioning the switch control lever (not shown) for the track switch 2W to its normal position, the signal control lever 1—2SGL is actuated to its right-hand position, and then the start button 2SPB for the field station No. 2 at the right-hand end of the passing siding A is actuated.

The actuation of this button 2SPB is effective by the closure of its contact in its depressed position to energize an obvious circuit for the relay 2CH, and the picking up of that relay closes a stick circuit including back contact 31 of relay 2LC, and front contact 32 of relay 2CH, to maintain the relay 2CH picked up subsequent to the restoration of the start button 2SPB until the communication apparatus is actually initiated into a cycle of operation for transmission to the associated field station by the picking up of the relay 2LC in a manner corresponding to that which has been specifically described in the above mentioned Hailes et al. patent.

Thus when the relay 2LC is picked up, it is maintained picked up throughout the cycle that is transmitted for the field station No. 2, and in accordance with the closure of the front contacts of this relay 2LC, the code characters selected by the signal control lever 1—2SGL and other selecting contacts are transmitted. For purposes of simplification of this disclosure of the present invention, the circuits incident to station selection are not shown, as well as the circuits for the selection of the switch control characters, as these selections are assumed to be provided according to the usual practice and as is illustrated in the above mentioned Hailes et al. patent.

Assuming the selection of station selection and switch control characters to be made in a suitable manner disclosed in the Hailes et al. patent, the energization of the next channel wire 33 closes a circuit for the energization of the relay LS for creation of an (LS) character, provided that the relay 3ETKP for the next field station in advance is in its energized position. This is a position which is assumed when a control is to be transmitted in response to the picking up of relay 3ETK for transmitting a control to pick up relay 2ETZ at field station No. 2 (see Fig. 2A), to effect the removal of steady energization when it has been applied to the track rails in the block between the passing siding A and B for initiating track circuit coding in setting up a route. The channel wire 33 is connected to the relay LS under these conditions through front contact 34 of relay 2LC and front contact 35 of relay 3ETKP. If, on the other hand, the relay 3ETKP is deenergized at the time the control cycle is transmitted, its back contact 35 selects the energization of the relay SL for forming an (SL) code character rather that an (LS) character for the No. 5 character of the code.

Similarly for the following code character an (LS) or (SL) character is selected for use in governing track circuit code transmission from the field station No. 1 (not shown) at the left-hand end of the passing siding A. The selective energization of a relay LS or SL under these conditions is accomplished by the connection of channel wire 36 through front contact 37 of relay 2LC in a manner similar to that which is disclosed for the corresponding field station No. 4, wherein this channel wire 36 is connected through front contact 38 of relay 4LC to relay LS or relay SL in accordance with whether contact 39 of relay 3WTKP is closed in its back or front position respectively.

Thus for each field station there are two control characters used in each control cycle in connection with track circuit code operation, one of the characters being used in connection with track circuit code feeding from an adjoining field station in one direction, and the other character being used in connection with track circuit code transmitted from the adjoining field station in the other direction.

The last two characters of the control code of each control cycle are selected in the usual manner for governing left and right directions for clearing signals as selected through contacts of a signal control lever, such, for example as by the signal lever 1—2SGL for controls transmitted to field station No. 2. Thus when the signal lever 1—2SGL is actuated to its right-hand position, for example, the relay LS is picked up for selecting an (LS) character for transmission as the seventh character of the code because of closure of front contact 40 of relay 2LC and contact 41 of lever 1—2SGL in its right-hand position. The relay SL is picked up for the following character because of its energization through front contact 42 of relay 2LC and contact 43 of lever 1—2SGL in its right-hand position. It will be readily understood that if the signal lever 1—2SGL is actuated to its left-hand position, the opposite order of the last two characters of the control code is selected and if the lever 1—2SGL is in its center position when a control cycle is transmitted, the relay LS is energized for both characters, and thus the seventh and eighth characters transmitted are both (LS) characters.

In a similar manner respective control cycles can be transmitted for the field stations 3 and 4, and for other field stations (not shown) that may be included in the system.

*Clearing of a signal*

To consider a typical mode of operation in clearing a signal, it will be assumed that the signal 2A is desired to be cleared for governing eastbound traffic through the block between the passing sidings A and B. It will be further assumed that such signal is designated to be cleared (at a time when the normal conditions of the system exist as they have been described) by the actuation of the signal control lever 1—2SGL at the control office to its right-hand position and that a control cycle is subsequently transmitted to field station No. 2. It is therefore provided that the control cycle transmitted has the code characters (SL), (SL), (LS), and (SL) for the characters Nos. 5, 6, 7, and 8 respectively according to circuit selections that have been described, and according to the code chart of Fig. 5.

With reference to Fig. 2A, the reception of such a control cycle at field station No. 2 is effective to pick up the signal control relay 2RGZ by energization of circuits fully described for a comparable relay in the above mentioned Hailes et al. patent, and the relays 2ETZ and 2WTZ are maintained in their dropped away positions because of the code characters Nos. 5 and 6 for their control being such as to effect the actuation of these magnetic stick relays by suitable decoding means, such as is shown in the Hailes et al. patent, to their dropped away positions. These relays 2ETZ and 2WTZ are already in their dropped away positions, however, under normal conditions, so they are not actuated by the control cycle under consideration.

Because of the relay 2RGZ being picked up, steady energy is applied to the track rails of the track section 2—3T for feeding through the block to field station No. 3, such steady energization being applied by the relay 2CP which is picked up in turn subsequent to the energization of relay 2TZP in response to the picking up of relay 2RGZ. More specifically, the relay 2RGZ in picking up closes a pick up circuit for the relay 2TZP extending from (+), including back contact 44 of relay 2ETZ, front contact 45 of relay 2RGZ, front contact 46 of relay 2AS, front contact 47 of the OS track repeater relay 1—2TP, back contact 48 of relay 2TC, back contact 49 of relay 2TCP, and winding of relay 2TZP, to (—). This relay when picked up closes a circuit for the energization of relay 2CP extending from (+), including back contact 50 of relay 2TR, front contact 51 of the OS track relay 1—2TR, front contact 52 of the approach stick relay 2AS, front contact 53 of relay 2TZP, and winding of relay 2CP, to (—). Relay 2CP when picked up connects the track battery 54 directly across the track rails of the track section 2—3T through its front contact 55.

The feeding of steady energy from the entrance end of the track section 2—3T for the route to be established provides for the steady energization of the track relay 3TR (see Fig. 2B) which is connected across the track rails at the right-hand end of that track section. The front repeater relay 3FP is picked up by the closure of front contact 56 of the track relay 3TR, and the closure of front contact 57 of relay 3FP at the intermediate signal location steadily energizes the transmitter relay 4CP which is associated with the track section 4—5T for the application of steady energy to the track rails of that track section. The circuit for the energization of relay 4CP under these conditions extends from (+), including back contact 58 of relay 4TR, contacts 59 and 60 of the mechanism of signal 4 in its stop position, back contact 61 of relay 4TCS, front contact 57 of relay 3FP, back contact 62 of relay 3TCS, and winding of relay 4CP, to (—). The track battery 63 is connected across the track rails at the left-hand end of the track section 4—5T in accordance with the closure of front contact 64 of relay 4CP.

At field station No. 3, the track relay 5TR becomes steadily energized in accordance with the steady energization of the track rails of track section 4—5T, and the picking up of this relay closes a circuit to effect the picking of of the transmitter control relay 5TC which governs the transmission of track circuit code to the left from field station No. 3 in the track section 4—5T. The circuit by which the relay 5TC is energized under these conditions extends from (+), including back contact 65 of relay 3WTZ, front contact 66 of relay 5TR, back contact 67 of relay 5TS, back contact 68 of relay 5TZP, back contact 69 of relay 5TCP, and upper winding of relay 5TC, to (—).

In accordance with the picking up of relay 5TC, the shifting of its contact 70 (see Fig. 2C) initiates the transmission of an indication cycle from field station No. 3 by interrupting the stick circuit for a relay (not shown) corresponding to relay $CH^2$ of Fig. 4 and to relay 2CH of Fig. 3A of the above mentioned Hailes et al. patent. During such indication cycle, because of the relay 5TC being picked up to open its back contact 71 (corresponding to back contact 207 of relay 1TC of Fig. 4), an indication is communicated to the control office that is effective to energize the magnetic stick relay 3ETK (see Fig. 1) with a polarity to actuate the contacts of that relay to their picked up positions.

Upon the picking up of relay 3ETK at the control office, a pick up circuit is closed for the control start relay 2CH to initiate the transmission of a control cycle for field station No. 2. The relay 2CH is energized under such conditions by a circuit extending from (+), including back contact 72 of relay 3ETKP, front contact 73 of relay 3ETK, winding of relay 2CH, and cancel button CAN in its normal position, to (—). When the relay 2CH is picked up, it is maintained picked up by its stick circuit until the control cycle for transmission to field station No. 2 is actually initiated by the picking up of relay 2LC in a manner which has been heretofore described when considering more specifically the transmission of controls from the control office.

As soon as the relay 2CH is picked up, a circuit is closed for the energization of the indication repeater relay 3ETKP which is associated with field station No. 3, such circuit including front contacts 74 and 75 of relays 2CH and 3ETK respectively. This relay 3ETKP, when picked up, is maintained picked up by its stick circuit including front contacts 76 and 75 of relays 3ETKP and 3ETK respectively so that it is maintained picked up until an indication is received at a later time which is effective to cause the restoration of the relay 3ETK to its dropped away position. The opening of back contact 72 of relay 3ETKP when that relay is picked up opens the circuit that has been described for the picking up of relay 2CH so that it is provided that the pick up circuit for relay 2CH is only momentarily closed.

Because of the relay 3ETKP being picked up during the transmission of the control cycle to field station No. 2, it is selected by front contact 35 of that relay that the code character No. 5 in the control cycle (see Fig. 5) is an (LS) character which is used for the picking up of relay 2ETZ at field station No. 2 (see Fig. 2A).

With reference to Fig. 2A, the relay 2ETZ which is picked up in response to the control cycle transmitted from the control office because of the character No. 5 being an (LS) character, is maintained picked up because of its magnetic stick characteristic. When this relay is picked up, the circuit that has been described by which the relay 2TZP has been energized is opened at back contact 44 and thus the relay 2TZP is dropped away, and the dropping away of that relay in turn effects the dropping away of relay 2CP by opening its circuit at front contact 53. When the relay 2CP becomes dropped away, the steady energy that has been applied at the left-hand end of the track section 2—3T is removed by the opening of front contact 55, and thus the steady energy becomes removed from the entire block between the passing sidings A and B, the dropping away of relay 3FP at the intermediate signal location (see Fig. 2B) being effective to open the circuit by which the relay 4CP has been steadily energized at front contact 57, and thus provide for the removal of energy from the track section 4—5T by the opening of front contact 64 of relay 4CP.

The removal of energy from the track section 4—5T causes the track relay 5TR at the right-hand end of that track section to be dropped away, and the dropping away of that relay establishes a stick circuit for the relay 5TC and also provides for the picking up of the repeater relay 5TCP. The stick circuit for relay 5TC extends from (+), including back contact 65 of relay 3WTZ, back contact 66 of relay 5TR, front contact 77 of relay 5TC, and lower winding of relay 5TC, to (−). The pick up circuit for relay 5TCP extends from (+), including back contact 65 of relay 3WTZ, back contact 66 of relay 5TR, front contact 77 of relay 5TC, and the upper winding of relay 5TCP, to (−).

The code oscillators 75CT and 180CT at field station No. 3 which are used for generating the code pulses have been initiated in response to the closure of front contact 78 of relay 5TC at the beginning of steady energization, but the transmission of track circuit code by the relay 5CP is not initiated until the termination of the steady energy of the block and the picking up of relay 5TCP in a manner which has been described. Thus in response to the picking up of relay 5TCP, under the assumed conditions, the relay 5CP becomes active to transmit a track circuit code at a 75 rate from the right-hand end of the track section 4—5T in the direction of the signal to be cleared at field station No. 2. The circuit by which the relay 5CP is rendered active extends from (+), including back contact 79 of relay 5TR, front contact 80 of the OS track relay 5—6TR, front contact 81 of the approach stick relay 6AS for signal 6, back contact 82 of the yellow-green repeater relay 6YGP for signal 6, coding contact 83 of oscillator 75CT, front contact 84 of relay 5TC, front contact 85 of relay 5TCP, back contact 86 of relay 5TZP, and winding of relay 5CP to (−).

The reception of the 75 rate code at the left-hand end of the track section 4—5T effects the pulsing of the track relay 4TR (see Fig. 2B), and in accordance with the pulsing of front contact 87 of that relay, the relay 3—4TP becomes active, and the pulsing of front contact 58 of relay 4TR provides for the picking up of relay 4FP which is maintained steadily picked up as long as the relay 4TR is active because of its slow drop away characteristics.

With relay 4FP picked up, and the track repeater relay 3—4TP active, the pulsing of the contact 88 of relay 3—4TP energizes the primary winding 89 of the decoding transformer 90 first in one direction and then the other according to the usual practice in decoding circuits through a circuit including front contact 91 of relay 4FP, back contact 92 of relay 3FP, and contact 88 of relay 3—4TP. The induced voltage in the secondary winding 93 of the decoding transformer 90 is commutated by the contact 94 of relay 3—4TP so as to provide for the direction current energization of the relay 3—4H. Although there is a voltage induced in the secondary winding 95 of the decoding transformer 90 which is connected through the decoding unit 180DU to the relay 3—4D, because of the energization being at a 75 rate, the relay 3—4D remains in its dropped away position.

With the relay 3—4H picked up, the signal selector relay 4TCS is picked up in accordance with the energization of the front repeater relay 4FP as a means for selecting the energization of the mechanism of signal 4 as well as the energization of the lamp of that signal. The mechanism of signal 4 is energized with negative polarity for actuation of the mechanism to its caution indication position by a circuit extending from (+), including front contact 96 of relay 3—4H, back contact 97 of relay 3TCS, front contact 98 of relays 4TCS, back contact 99 of relay 3—4D, winding of signal 4, and back contact 100 of relay 3—4D, to (−).

The actuation of the mechanism of signal 4 to its caution indicating position renders the yellow-green repeater relay 4YGP for signal 4 energized during the "off" periods of the track circuit code received at the left-hand end of the track section 4—5T, the slow drop away characteristics of the relay 4YGP being such as to maintain that relay steadily picked up as long as the code is received. The circuit for the energization of the relay 4YGP includes back contact 58 of relay 4TR, and contacts 59 and 60 of the mechanism of signal 4.

The code oscillators 180CT and 75CT at the intermediate signal location are rendered active in response to the picking up of the transmitter control relay 4TCS upon the closure of front contact 101, and the relay 3CP then becomes active to transmit a code from the right-hand end of the track section 2—3T at a 180 rate as selected by the energization of the yellow-green repeater relay 4YGP. The circuit by which the relay 3CP is energized for each pulse of the oscillator 180CT under these conditions extends from (+), including back contact 56 of relay 3TR, contacts 102 and 103 of the mechanism of signal 3 in its stop position, back contact 104 of relay 3TCS, contact 105 of oscillator 180CT, front contact 106 of relay 4YGP, front contact 107 of relay 4TCS, and winding of relay 3CP, to (—). The pulsing of contact 108 of relay 3CP applies pulses to the track rails of the track section 2—3T in an obvious manner.

The reception at the left-hand end of the track section 2—3T of the 180 rate code pulses the contact 50 of relay 2TR (see Fig. 2A) so as to render the track repeater relay 2TP active through front contact 109 of the magnetic stick relay 2ETZ which has been picked up by a control communicated from the control office. It will be noted that the code transmitter control relays 2TC and 2TCP which are used in initiating code transmission at field station No. 2 for westbound traffic cannot be picked up by the pulsing of the track relay 2TR because their circuits are open at this time at back contact 110 of the office controlled relay 2ETZ.

The pulsing of contacts 111 and 112 of the track repeater relay 2TP is effective through the decoding transformer 113 to pick up the relay 2H in a manner comparable to that which has been described for the energization of the relay 2—4H at the intermediate signal location. Energy is applied to the transformer 113 through front contact 117 of relay 2ETZ. The energization of the winding 114 of the decoding transformer 113 is effective through front contacts 115 and 116 of the relay 2H to energize the relay 1—2D so as to cause that relay to be picked up through the decoding unit 180DU, which is tuned to the 180 rate code that is received under the assumed conditions. When the relay 1—2D becomes picked up, the relay 2BS is picked up by the energization of a circuit extending from (+), including front contact 118 of relay 2ETZ, front contact 119 of relay 1—2D, and winding of relay 2BS, to (—). The picking up of this relay establishes a stick circuit by its front contact 120 to shunt the front contact 119 of relay 1—2D out of the circuit that has just been described. The relay 2BS is used in the control of block indications in a manner to be hereinafter considered, and the picking up of this relay is also required for the clearing of signal 2A.

The picking up of the block stick relay 2BS checks that the block is unoccupied by a train because of such relay requiring the code to be built up to a 180 rate before it can be picked up. It is provided that the clearing of the signal 2A is dependent upon the block stick relay 2BS being picked up, so therefore there is a check in the control circuit of signal 2A that the block in advance is unoccupied prior to the clearing of that signal. It is to be understood that this condition is effective, however, only when the signal 2A is cleared immediately subsequent to initiation of track circuit coding in the block between the passing sidings A and B. In other words, once the block stick relay BS has been picked up, its stick contact 120 shunts the front contact of the relay 1—2D in its pick up circuit so that the relay 2BS is maintained picked up to permit the mechanism of signal 2A to be actuated to its caution position in response to a 75 code rate received at the left-hand end of the track section 2—3T for governing passage of a second eastbound train when a first eastbound train is occupying the track section 4—5T. This condition will be further discussed hereinafter when considering specifically typical operating conditions upon passage of trains.

With reference to Fig. 3, the circuit by which the mechanism of signal 2A is energized with positive polarity for providing a clear indication extends from (+), including back contact 121 of relay LR, front contact 122 of relay 1—2TR, front contact 123 of 2BS, front contact 124 of relay 2RGZ, front contact 125 of relay 2H, front contact 126 of relay 1AS, front contact 127 of relay 1—2D, back contact 128 of relay 2RCR, front contact 129 of relay 2NCR, winding of signal 2A, and front contact 130 of relay 1—2D, to (—). The lamp of signal 2A may be steadily energized, or it may include suitable approach control means as indicated by the marks XX in the circuit for the lamp according to Fig. 3.

Having thus provided for the clearing of signal 2A, the operator may proceed in setting up his route further for the train to clear signal 6A (see Fig. 2C) or signal 6B in accordance with whether or not it is required that the train be routed into the passing siding B. The mode of operation in setting up the route involving the clearing of signal 6A is comparable to that which has been specifically described with reference to the clearing of signal 2A. This mode of operation involves the transmission of a control from the control office for picking up the relay 3RGZ at a field station No. 3 (see Fig. 2C), and the picking up of that relay causes the picking up of the relay 6TZP, which in turn causes the picking up of relay 6CP to apply the steady energy across the track rails of the track section 6—7T.

The circuit by which the relay 6TZP is energized under these conditions extends from (+), including back contact 131 of relay 3ETZ, front contact 132 of relay 3WZ, front contact 133 of relay 3RGZ, front contact 134 of relay 5AS, front contact 135 of the OS track repeater relay 5—6TP, back contact 136 of relay 6TC, back contact 137 of relay 6TCP, and winding of relay 6TZP, to (—). The circuit by which the relay 6CP is picked up in response to the picking up of relay 6TZP extends from (+), including back contact 138 of relay 6TR, front contact 139 of relay 5AS, front contact 140 of the OS track relay 5—6TR, front contact 141 of relay 6TZP, and winding of relay 6CP, to (—). The closure of front contact 142 of relay 6CP connects the track battery 143 across the track rails of the track section 6—7T.

Upon the reception of the steady energization at the right-hand end of the track section 6—7T (not shown), a relay comparable to the relay 1TC at the right-hand end of track section 1T of Fig. 2A is picked up, and the picking up of that relay is effective to transmit an indication to the control office in response to the reception of steady energy, such indication at the control office being effective to initiate the transmission of a control cycle to field station No. 3 for removing the steady energy. The comparable circuit of relay 1TC extends from (+), including back contact 144 of relay 2WTZ, front contact 145 of track relay 1TR, back contact 146 of relay 1BS, back contact 147 of relay 1TZP, back contact 148 of relay 1TCP, and upper winding of relay 1TC, to (−). The relay 1TC is provided with a stick circuit, and this relay governs the picking up of the relay 1TCP in a manner corresponding to that which has been specifically described for similar relays 5TC and 5TCP (see Fig. 2C) at the right-hand end of the track section 4—5T.

Thus the office equipment, after having received an indication that the steady energy has been received at the right-hand end of the track section 6—7T whereby the relay 4ETK (see Fig. 1) is picked up, initiates a control cycle for transmission to field station No. 3 for causing the removal of the steady energy. The initiation of this control cycle is accomplished because of the energization of the relay 3CH by a circuit extending from (+), including back contact 149 of relay 4ETKP, front contact 150 of relay 4ETK, winding of relay 3CH, and the normally closed contact of the cancel button CAN, to (−). Thus it will be seen that the initiation of the control cycle in response to an indication being received from field station No. 3 that steady energy has been received at that station is accomplished in a manner comparable to that which has been specifically described for the automatic initiation of a control cycle for transmission to field station No. 2.

The control cycle transmitted for the termination of the steady energization of the track section 6—7T comprises (LS) and (SL) characters as Nos. 5 and 6 characters respective of the control code so as to effect the picking up of the magnetic stick relay 3ETZ (see Fig. 2C) at field station No. 3.

This relay 3ETZ when picked up opens the circuit for the relay 6TZP at back contact 131, and the dropping away of relay 6TZP in turn opens the circuit for the relay 6CP at front contact 141 to cause the dropping away of that relay, and the removal of the condition of steady energization from the track section 6—7T by the opening of front contact 142. When energy is removed from a track section 6—7T, a relay (not shown) that is comparable to the relay 1TCP of Fig. 2A is picked up, and the picking up of that relay is effective to initiate code transmission at the right-hand end of track section 6—7T. This comparable circuit for relay 1TCP extends from (+), including back contact 144 of relay 2WTZ, back contact 145 of relay 1TR, front contact 151 of relay 1TC, and winding of relay 1TCP, to (−). The initiation of coding is effective by rendering a relay 7CP (not shown) active by a circuit comparable to the circuit for relay 1CP which extends from (+), including back contact 152 of relay 1TR, front contact 153 of relay 1AS, front contact 154 of relay 1—2TR, contact 155 of the code oscillator 75CT, back contact 156 of relay 2YGP, front contact 157 of relay 1TC, front contact 158 of relay 1TCP, back contact 159 of relay 1TZP, and winding of relay 1CP, to (−).

With reference to Fig. 2C, the reception of the 75 code at the left-hand end of track section 6—7T causes the pulsing of the contacts of the track relay 6TR, and thus, because of the relay 3ETZ being picked up at this time, the track repeater relay 6TP becomes active because of front contact 160 of relay 3ETZ being closed. The pulsing of the contacts 161 and 162 of that relay, provides for the energization of relay 6H through its associated decoding transformer 163. The closure of front contact 164 of relay 6H closes an obvious circuit extending through a front contact 165 of relay 3ETZ whereby the block stick relay 6BS is picked up. When this relay is picked up, the closure of its front contact 166 establishes a stick circuit to maintain that relay picked up until the shut down of the system is subsequently rendered effective wherein the relay 3ETZ is actuated to its dropped away position by a control transmitted from the control office.

The relay 6BS when picked up closes a circuit by which the signal 6A may be actuated to display a caution indication, the control circuit for the signal 6A being comparable to the control circuit for the signal 1A as illustrated in Fig. 3 for the opposite direction of traffic. This comparable circuit can be traced from (+), including back contact 121 of relay LR, front contact 122 of the OS track relay 1—2TR, back contact 123 of relay 2BS, front contact 167 of relay 2LGZ, front contact 168 of relay 2AS, back contact 169 of relay 2RCR, front contact 170 of relay 2NCR, front contact 171 of relay 1BS, front contact 172 of relay 1H, back contact 173 of relay 1—2D, winding of signal 1A, and back contact 174 of relay 1—2D, to (−). Thus in this manner the signal 6A can be actuated to its caution indicating position, and as the route is further extended through the portion of the track layout extending beyond the passing siding B, the code rate in the track section 6—7T can be built up to a 180 rate to permit the aspect of signal 6A to be changed from yellow to green.

The clearing of signal 6 under these conditions causes the picking up of the associated signal repeater relay (not shown) that is comparable to the relay 1YGP which is shown in Fig. 3 as having a circuit whereby it is energized when signal 1A is actuated to its clear or caution indicating positions. The circuit by which the relay 1YGP is energized when signal 1A is clear extends from (+), including contacts 175 and 176 of signal 1B which are closed when that signal is at stop, and contact 177 of signal 1A which is actuated to its left-hand position when the signal 1A is cleared, and the winding of relay 1YGP, to (−). It is to be understood that the relay 6YGP, shown only in block form in Fig. 2C, is similarly controlled, and thus this relay becomes picked up when the signal 6A is actuated to either its clear or caution indicating position. Thus, the picking up of relay 6YGP is effective to select the contact 178 of the oscillator 180CT, rather than the contact 83 of the oscillator 75CT, for governing the pulsing of the code transmitter relay 5CP so as to change the code rate of the code transmitted in the track section 4—5T from the right-hand end thereof from a 75 to a 180 rate.

In accordance with the increase in the code rate in the track section 4—5T, the relay 3—4D at the intermediate signal location (see Fig. 2B) becomes picked up because of its energization through its associated decoding unit 180DU and through the decoding transformer 90. The shifting of contacts 99 and 100 of the relay 3—4D pole changes the signal 4 so as to energize the mechanism of that signal with a polarity to change the signal aspect from yellow to green.

The control of the signals as has been described has been on the assumption that an eastbound train is to make a movement straight through on the main track, and it is only under these conditions that the direction of coding in the track section 6—7T which is within the siding limits is established. In other words, if the eastbound train is to enter the siding B, the signal 6B is selected for energization because of the track switch 3W being called for to be operated to its reverse position, and therefore there is no coding initiated in the track section 6—7T because it may be desirable for code operation to be set up through that track section for westbound traffic, if there is to be a meeting of trains at the siding B.

More specifically, if the track switch 3W is called for during a control cycle transmitted for the clearing of a signal governing eastbound traffic at field station No. 3, the relay 3WZ is knocked down by the code received, and thus the signal control relay 3RGZ when picked up cannot effect the picking up of the relay 6TZP and the initiation of steady energization in the track section 6—7T because of the circuit for relay 6TZP being held open at front contact 132 of the switch control relay 3WZ.

Although the circuit is not shown for the specific control of the signal 6B, it is to be understood that this signal is controlled in a manner comparable to that shown in Fig. 3 for the corresponding signal 1B for the opposite direction of traffic. It is thus illustrated in Fig. 3 that the signal 1B is actuated to its caution indicating position when the track switch 2W has completed its operation to its reverse position, if it is assumed that the relay 2LGZ is picked up from the control office to designate the clearing of a signal for westbound traffic. The circuit by which the signal 1B would be energized under such conditions extends from (+), including back contact 121 of the lock relay LR, front contact 122 of relay 1—2TR, back contact 123 of relay 2BS, front contact 167 of relay 2LGZ, front contact 168 of relay 2AS, back contact 170 of relay 2NCR, front contact 169 of relay 2RCR, winding of signal 1B and back contact 174 of relay 1—2D to (—). It will be noted that the normal correspondence relay 2NCR would be dropped away under these conditions when the opposite position of the track switch 2W would be called for; and the completion of the operation of the switch to its reverse position would apply reverse polarity to the wires 26 and 27 to pick up the reverse repeater relay 2RWP. This relay 2RWP is a straight reverse repeater relay, so there is a separate reverse correspondence relay 2RCR which is energized through back contact 179 of relay 2WZ and front contact 180 of relay 2RWP.

*Passage of trains*

To consider the mode of operation of the system upon passage of trains, it will be assumed that an eastbound train is in approach of signal 2A after that signal has been cleared in a manner which has been described, and after a through route has been lined up on the main track for that train with the track switches 2W and 3W actuated to their normal positions. Under these conditions, it will be assumed that controls will have been communicated from the office for the clearing of signals at both field stations Nos. 2 and 3 so that the signal 2A is clear and so that the signal 6A is either at clear or caution, in accordance with whether or not the signal (not shown) for governing eastbound traffic at the right-hand end of the passing siding B is at clear or caution so as to permit the transmission of a 180 code in the track rails of the track section 6—7T (see Fig. 2C). It is to be understood that the track circuit code has been set up in the track section 1T for the approach of a train in a manner corresponding to that which has been specifically described for the setting up of code in track section 6—7T.

When the train accepts the signal 2A and enters the OS track section 1—2T, the dropping away of the track relay 1—2TR is rendered effective, and the dropping away of this relay in turn is effective to both restore the signal 2A to stop and to restore the office control signal control relay 2RGZ. The signal 2A is restored to stop because of the opening of its circuit at front contact 122 (see Fig. 3) of relay 1—2TR, and the relay 2RGZ is dropped away by the opening of its stick circuit. The stick circuit by which the relay 2RGZ is maintained picked up at this time extends from (+), including back contact 225 of relay 2B, front contact 226 of relay 1—2TR, front contact 227 of relay 2RGZ, and upper winding of relay 2RGZ, to (—). Because of the track repeater relay 1—2TP being slow in dropping away and being energized through front contact 228 of relay 1—2TR, when the train enters the track section 1—2TR the front contact 226 is opened prior to the closure of back contact 229 of relay 1—2TP so that the relay 2RGZ is slotted off as the train accepts the signal 2A and enters the track section 1—2T. The relay 2RGZ when dropped away also opens the signal control circuit at front contact 124 to prevent the signal from being cleared again until another signal clearing control is transmitted from the control office for picking up that relay.

As the eastbound train progresses further along the trackway so as to enter the track section 2—3T, the shunting of the track rails of that track section renders the track relay 2TR inactive, and thus provides for the dropping away of the home and distant relays 2H and 1—2D.

As the train proceeds further along the route, it accepts the signal 4, which may be assumed to be clear because of the reception of a 180 code transmitted through the track rails of the track section 4—5T. When the track section 4—5T becomes shunted, the home and distant relays 3—4H and 3—4D respectively are dropped away, and the mechanism of signal 4 is actuated to its stop position because of the opening of front contact 96 of relay 3—4H. The relay 4TCS, however, is maintained picked up by its stick circuit which extends from (+), including back contact 181 of relay 3TCS, front contact 182 of relay 4TCS, back contact 183 of relay 3—4H, and winding of relay 4TCS, to (—). The relay 4TCS is sufficiently slow in dropping away to be maintained picked up during the shifting of the contact 183 of relay 3—4H to shift from its pick-up to its stick circuit. Therefore the relay 4TCS maintains the lamp of signal 4 energized through its front contact 184 so as to cause signal 4 to display a red aspect in accordance with the occupancy of the track section 4—5T.

As the train progresses further so as to leave the track section 2—3T unoccupied, the transmission of code through the track section 2—3T is again effective to pick up the relay 2H (see Fig. 2A) at field station No. 2 so as to condition the signal 2A so that it can be actuated to its caution indication position in case a control is communicated from the control office for setting up a route for a following train. The relay 1—2D is not picked up at this time because the code rate that is transmitted under the assumed conditions is a 75 rate on account of the track section 4—5T being occupied. More specifically, with reference to Fig. 2B, because of the signal 4 being at stop, the signal repeater relay 4YGP is necessarily dropped away by the opening of its circuit at the contacts 59 and 60 of the signal mechanism, and the dropping away of this relay is effective by the shifting of contact 106 to select the contact 185 of the oscillator 75CT as being effective to govern the pulsing of the code transmitter relay 3CP, rather than the contact 105 of the oscillator 180CT.

Assuming further progress of the eastbound train, when the train accepts the signal 6A (see Fig. 2C) and enters the detector track section 5—6T the signal 6A is put to stop because of the dropping away of the track relay 5—6TR. The restoration of signal 6A to stop causes the dropping away of its repeater relay 6YGP, and the dropping away of that relay is effective by shifting its contact 82 to cause the relay 5CP to be pulsed at a 75 rate rather than a 180 rate by the selection of the contact 83 of the oscillator 75CT as being included in the circuit for relay 5CP, rather than the contact 178 of the oscillator 180CT.

The entrance of the eastbound train into the track section 6—7T is effective to render the track relay 6TR inactive, and thus the relay 6TP becomes inactive and the relay 6H becomes dropped away, together with the relay 5—6D (if it is assumed that a route has been established sufficiently in advance to have provided for the transmission of a 180 code through the track rails of the track section 6—7T).

When the track section 4—5T becomes unoccupied in the rear of the train, the 75 code which is applied across the track rails of that track section is effective to pick up the relay 2-4H (see Fig. 2B) at the intermediate signal location in a manner corresponding to that which has been described when considering the setting up of a route initially. Thus, at the intermediate location, the signal 4 is actuated to its caution indicating position because of the relay 4TCS associated with the signal 4 having been maintained picked up by its stick circuit through its front contact 182. It will be noted that this relay 4TCS is maintained picked up by its stick circuit until the shutting down of the system is rendered effective in a manner to be hereinafter described.

By the actuation of the signal 4 to its caution indicating position, the signal repeater relay 4YGP is picked up, and the shifting of the contact 106 of that relay, renders the code transmitter relay 3CP active at a 180 rate rather than a 75 rate so as to condition the signals at the field station No. 2, for clearance if it is desired to set up a route for a following train.

Similarly the signal 6A (see Fig. 2C) is conditioned in the rear of the eastbound train so that it can indicate caution for a following train when the track section 6—7T becomes unoccupied in the rear of the first train, and as the first train proceeds further through the section of the track layout which is not shown, the code rate is permitted to be built up to a 180 rate in the track section 6—7T if proper signal controls are communicated from the control office for the establishment of a route for a following train.

If there is to be a melting of trains at the siding B, for example, it may be assumed that the signal 6B is actuated to its caution indicating position in a manner that has been heretofore described when considering the mode of operation in the clearing of signals so that an eastbound train is routed into the passing siding B. It will be noted that the control of the signal 6B under these conditions does not initiate coding in the track section 6—7T, and thus the westbound train that is approaching for the meet at the passing siding B will be governed by an entering signal (not shown) at the right-hand end of the passing siding B (corresponding to the signal 1A at field station No. 2), the mode of operation in the clearing of such signal being accomplished in a manner corresponding to that which has been specifically described for the clearing of the opposing signal 6A at the left-hand end of the passing siding B. It will thus be seen that there is no conflict in the control of the direction of code transmission in the track section 6—7T because the actuation of the track switch at either end of the siding to its reverse position is effective to select that the setting up of that route does not establish coding in the stretch of track within the limits of the siding, and thus permits the coding to be set up for the opposing train that is remaining on the main track.

Having thus considered various typical conditions of train operation which may be encountered in practice with more specific preference being given to the progress of eastbound trains, it is to be understood that the system is symmetrical in its circuit organization for both directions of traffic, so that similar modes of operation are accomplished for opposite directions of traffic to those that have been considered, and it is also believed that it should be readily apparent from the typical conditions that have been considered as to the manner in which signals can be cleared for governing back up and switching movements, and other traffic conditions which may be encountered in practice.

*Shut down or track circuit coding*

Under the conditions that have been considered during passage of a train, some of which are illustrated diagrammatically in Figs. 6C, 6D, and 6E, it will be noted that there is no energy applied to the track rails in the rear of a train feeding in the direction of traffic for shut down purposes while the train is occupying a portion of the trackway in which shut down is to be considered, as this energy is applied to the stretch of track between the passing sides A and B, for example, only after such stretch becomes unoccupied in the rear of a train so as to permit the first track section for the established direction of traffic to have a 180 code established as a means for indicating that the block between the passing sidings is unoccupied and that the shutting down of the respective code transmitters can then be initiated.

Thus if it is assumed that the block between the passing sidings A and B has become unoccupied in the rear of an east-bound train as is indicated in the diagram of Fig. 6E, and that the operator at the control office has previously restored his signal control lever 1—2SGL to its normal center position, a sequence of operations is initiated in response to the block becoming unoccupied for the shutting down of the code transmitters comprising successively, the transmission of steady energy through the track rails from the entrance end of the block, the reception of such steady energy at the right-hand end of the block, the transmission of an indication cycle from the right-hand end of the block to the control office indicating that the steady energy has been received, the transmission from the control office of a control to remove the condition of steady energization from the entering end of the block, and the subsequent restoration of the track circuit apparatus within the block to its normally deenergized and normally inactive condition.

To consider the specific organization for providing this mode of operation, the reception of the 180 rate code at the left-hand end of the track section 2—3T causes the relay 1—2D (see Fig. 2A) to again be picked up, and the picking up of this relay, with the office controlled relay 3RGZ in its dropped away position, is effective to pick up the relay 2TZP, which then in turn picks up the relay 2CP to apply steady energy to the track rails of the track section 2—3T upon the closure of front contact 55. The circuit by which the relay 2TZP is picked up under these conditions extends from (+), including front contact 44 of relay 2ETZ, front contact 186 of relay 1—2D, back contact 45 of relay 2RGZ, front contact 46 of relay 2AS, front contact 47 of relay 1—2TP, back contact 48 of relay 2TC, back contact 49 of relay 2TCP, and winding of relay 2TZP, to (—). The picking up of this relay closes a stick circuit at front contact 187 to shunt the front contact 186 of relay 1—2D out of the circuit just described so as to maintain the relay 2TZP steadily picked up after the steady energy is applied, and thus after the relay 1—2D is dropped away because of the coding being rendered ineffective.

The circuit by which the relay 2CP is picked up under these conditions extends from (+), including back contact 50 of relay 2TR, front contact 51 of relay 1—2TR, front contact 52 of relay 2AS, front contact 53 of relay 2TZP, and winding of relay 2CP, to (—). It will be noted that this circuit includes a back contact 50 of the track relay 2TR, and thus the relay 2CP must be picked up during an "off" period of the code which is being received at the left-hand end of the track section 2—3T. The picking up of relay 2CP during this "off" period is effective to render the code transmitter at the right-hand end of the track section 2—3T inactive by similar means in that the picking up of the track relay 3TR (see Fig. 2B) at the right-hand end of the track section 2—3T is effective to open the circuit for the code transmitter relay 3CP at its back contact 56 and in this manner render the code transmitter relay 3CP inactive for the transmission of code pulses in the track section 2—3T.

Because of the relay 3TR being steadily picked up, the relay 3FP is picked up, and the picking up of that relay is effective to cause the restoration of relay 4TCS to its deenergized position by the opening of the circuit for that relay at back contact 188. The relay 3—4H is picked up at this time, so that the stick circuit for relay 4TCS is open at back contact 183. The relay 4TCS must be dropped away before steady energy can be applied to the track section 4—5T. Thus the relay 3—4H is maintained picked up by track circuit code until the relay 4TCS is dropped away. Upon the dropping away of the relay 4TCS, the signal 4 is put to stop by the opening of the circuit for its mechanism at front contact 98, and also the opening of front contact 184 of relay 4TCS deenergizes the lamp of signal 4.

After the mechanism of signal 4 has been restored to its stop position, with the relay 3FP picked up, the relay 4CP becomes steadily energized during the next "off" period of the code that is received at the left-hand end of the track section 4—5T. The circuit by which the relay 4CP is steadily energized under these conditions extends from (+), including back contact 58 of relay 4TR, contacts 59 and 60 of the mechanism of signal 4 in its stopped position, back contact 61 of relay 4TCS, front contact 57 of relay 3FP, back contact 62 of relay 3TCS, and winding of relay 4CP, to (—). Thus steady energization is applied across the track rails of the track section 4—5T at the intermediate signal location by the closure of front contact 64.

The reception of such steady energization at the right-hand end of the track section 4—5T immediately renders the code transmitter relay 5CP (see Fig. 2C) inactive by the opening of its circuit at back contact 79. The shifting of contact 66 of the track relay 5TR opens the stick circuit for relay 5TC and thus causes the relay 5TC to be dropped away, its pick up circuit being held open at back contact 69 of the relay 5TCP which is picked up at this time. The relay 5TCP is maintained energized during the time when the relay 5TR is picked up by its stick circuit which extends from (+), including back contact 65 of relay 3WTZ, front contact 66 of relay 5TR, back contact 67 of relay 5BS, back contact 68 of relay 5TZP, front contact 69 of relay 5TCP, and lower winding of relay 5TCP, to (—). Thus, the relay 5TC is dropped away in response to the steady energization of the track relay 5TR, and the relay 5TCP is maintained steadily energized throughout the period of steady energization to hold the pick up circuit for the relay 5TC open.

Relay 5TC when dropped away is effective by the shifting of its contact 70 to initiate the code communication system for the transmission of an indication cycle from field station No. 3 in which an indication is transmitted in accordance with the closure of back contact 71 of relay 5TC that the steady energy has been received so that the reception of such indication at the control office can be effective to automatically cause the transmission of a control to field station No. 2 for removing the condition of steady energization.

With reference to Fig. 1, the reception of the indication at the office that the steady energy has been received at the right-hand end of the block causes the relay 3ETK to be actuated to its dropped away position, which in turn is effective to momentarily energize the pick up circuit for the relay 2CH as a means for initiating the transmission of a control to field station No. 2. The circuit for relay 2CH under these conditions extends from (+), including front contact 72 of relay 3ETKP, back contact 73 of relay 3ETK, winding of relay 2CH, and cancel button CAN in its normal position, to (—). The stick circuit which is closed at back contact 31 of relay 2LC maintains the relay 2CH picked up until the communication system is available for the transmission of the control cycle for the station No. 2.

The relay ETK in being dropped away under these conditions opens the stick circuit for the relay 3ETKP at front contact 75 to cause that relay to be dropped away and thus open the pick up circuit at front contact 72 that is only momentarily established for the relay 2CH. The relay 3ETKP is also effective by the closure of its back contact 35 to select the code character (SL) for transmission during the control cycle that has been initiated as the fifth character of the cycle for the purpose of restoring the magnetic stick relay 2ETZ (see Fig. 2A) at field station No. 2 as a means for initiating the removal of steady energy from the track rails of the block. The manner in which this control is communicated has been heretofore more specifically considered when considering the transmission of controls from the control office.

With reference to Fig. 2A, the dropping away of the relay 2ETZ upon reception of the (SL) character as the fifth character of the control cycle opens the stick circuit by which the relay 2TZP has been energized at front contact 44 to cause this relay to be dropped away. The pick up circuit by which the relay is initially picked up when setting up a route is open at this time at front contact 45 of relay 2RGZ, this relay having been dropped away by the passage of a train.

The dropping away of relay 2TZP causes the deenergization of relay 2CP by the opening of its circuit at front contact 53, and the relay 2CP in dropping away removes the steady energy from the track rails from the track section 2—3T by the opening of front contact 55. The dropping away of the relay 2ETZ in response to the control communicated from the control office is also effective to restore the block indication control relay 2BS by opening its stick circuit at front contact 118, and to deenergize the decoding transformer 113 that is associated with the control of relays 2H and 1—2D by the opening of its circuit at front contact 117, thus completing the restoration of the apparatus at field station No. 2 to its normal conditions.

The removal of the steady energy from the track rails of the track section 2—3T is effective at the intermediate location (see Fig. 2B) to effect the restoration of the track relay 3TR and thus cause the dropping away of relay 3FP, which in turn, by the opening of its front contact 57 effects the restoration of relay 4CP to its normally deenergized position so as to terminate the condition of steady energization of the track rails of the track section 4—5T by the opening of its front contact 64, thus completing the restoration of the apparatus at the intermediate signal location to its normal conditions.

At field station No. 3, the cessation of steady energization in the track section 4—5T causes the track relay 5TR to be dropped away, and the dropping of that relay opens the stick circuit for the relay 5TCP at front contact 66 to cause that relay to be dropped away. Energy cannot be applied to the pick up circuit of relay 5TCP through back contact 66 of the track relay 5TR at this time because the relay 5TC has been dropped away at the beginning of the period of steady energization so that front contact 77 in the pick up circuit for relay 5TCP is open.

It will therefore be readily recognized from the mode of operation that has been described that the relay 5TC is picked up in response to steady energization of the track rails when track circuit coding is being initiated because of the relay 5TCP being in its dropped away position at that time to close its back contact 69. When steady energy is received in shutting down the system, however, the relay 5TC is dropped away in response to such steady energy as has been described, the circuit for relay 5TC being maintained open by relay 5TCP at back contact 69 until termination of the condition of steady energy.

In a similar manner the shutting down of coding in the track section 6—7T is accomplished subsequent to the passage of a train. Thus, to consider a typical condition, it will be assumed that an eastbound train accepts the signal 6A after a route has been properly established as has been heretofore described, and upon the entering of the train into the OS track section 5—6T, the signal control relay 3RGZ is deenergized by the opening of its stick circuit (not shown) which corresponds to a stick circuit shown for a comparable relay RGZ in the above mentioned Hailes et al. patent.

After the train progresses further so as to pass through the track section 6—7T and leave that track section unoccupied in the rear of the train, a 75 rate code is effective to pulse the track relay 6TR at field station No. 3, and the pulsing of contact 138 of that relay provides for the relay 6TP to become active and therefore cause the picking up of relay 6H by the energization of circuits which have been heretofore described when considering the mode of operation for the clearing of signals. When the relay 6H becomes picked up, with the relay 3RGZ in its dropped away position, a circuit is closed for the energization of the relay 6TZP, the picking up of which is effective to cause the picking up of relay 6CP to apply steady energy across the track rails at the left-hand end of the track section 6—7T. The circuit by which the relay 6TZP is energized under these conditions extends from (+), including front contact 131 of relay 3ETZ, front contact 189 of relay 6H, back contact 133 of relay 3RGZ, front contact 134 of relay 5AS, front contact 135 of relay 5—6TP, back contact 136 of 6TC, back contact 137 of relay 6TCP, and winding of relay 6TZP, to (−). It will be noted that the inclusion of front contact 190 of relay 3RCR in multiple with the circuit portion including front contacts 134 and 135 of relays 5AS and 5—6TP provides a means for permitting the shutting down to become effective, and also the initiation of coding to become effective at times when train movements are in progress over the track switch 3W. When the relay 6TZP is picked up, the relay 6CP becomes steadily energized during the next off period of the code that is received at the left-hand end of the track section 6—7T. The circuit for the energization of relay 6CP under these conditions extends from (+), including back contact 138 of relay 6TR, front contact 139 of relay 5AS, front contact 140 of relay 5—6TR, front contact 141 of relay 6TZP, and winding of relay 6CP, to (−). The front contacts 139 and 140 of relays 5AS and 5—6TR in this circuit can be shunted by front contact 191 of relay 3RCR for purposes that have been described for a similar circuit selection in the circuit for the relay 6TZP. The relay 6CP when picked up applies energy steadily across the track rails of track section 6—7T through its front contact 142. The relay 6TZP is maintained picked up by its stick circuit including its front contact 192 which shunts front contact 189 of relay 6H, and thus relay 6TZP is maintained picked up after cessation of the code drop away relay 6H.

The reception of the condition of steady energization at the right-hand end of the track section 6—7T is accomplished by circuits that are not shown but that are comparable to the circuits shown for the field station No. 2 at the right-hand end of the track section 1T as shown in Fig. 2A. Thus it will be seen in Fig. 2A that the reception of steady energy for shutting down the coding at the right-hand end of the track section 1T steadily energizes the track relay 1TR and thus opens the circuit for the code transmitter relay 1CP at back contact 152 to render that code transmitter relay inactive. The relay 1TC is then dropped away because of its circuits being open at back contacts 145 and 148 of relays 1TR and 1TCP respectively, and the dropping away of relay 1TC is effective to transmit an indication to the office that the condition of steady energization is received in a manner corresponding to that which has been more specifically described with respect to the transmission of an indication to the office from field station No. 3 in accordance with the dropping away of the relay 5TC at that field station during the shutting down of track circuit code in the block between the passing sidings A and B.

Thus in a corresponding manner the relay 4ETK (see Fig. 1) is dropped away in response to an indication that the steady energy has been received at the right-hand end of the track section 6—7T for shut down purposes. Under these conditions the relay 3CH is picked up for initiation of a control cycle for transmission to field station No. 3 providing a control for the actuation of the relay 3ETZ (see Fig. 2C) at that field station to its dropped away position. The relay 3CH (see Fig. 1) is picked up under these conditions by a circuit extending from (+), including front contact 149 of relay 4ETKP, which is picked up at this time, back contact 150 of relay 4ETK, winding of relay 3CH, and cancel button CAN, to (—). The stick circuit for relay 4ETKP is opened at front contact 193 of relay 4ETK, but because of the slow drop away characteristics of relay 4ETKP, the relay 3CH has time to be picked up prior to the opening of the pick up circuit just described for that relay at front contact 149 of relay 4ETKP. Because of the relay 4ETKP being dropped away during the control cycle transmitted to field station No. 3, the closure of its back contact 194 selects the transmission of an (SL) character as the No. 5 character of the cycle so as to provide a control for the restoration of the relay 3ETZ at field station No. 3 according to the code chart of Fig. 5.

The dropping away of relay 3ETZ at field station No. 3 opens the stick circuit by which the relay 6TZP (see Fig. 2C) has been maintained picked up at front contact 131 to cause that relay to be dropped away, and the dropping away of relay 6TZP in turn effects the deenergization of relay 6CP by the opening of front contact 141 so that the relay 6CP is dropped away to open front contact 142 and remove the steady energy from the track section 6—7T.

The removal of steady energy from the track section 6—7T acts upon apparatus (not shown) at the right-hand end of that track section in a manner comparable to the mode of operation accomplished in response to the removal of steady energy from the track section 1T (see Fig. 2A) under similar operating conditions. Thus the removal of steady energy from the track section 1T causes the dropping away of the track relay 1TR, and the dropping away of that relay is effective by the opening of its front contact 145 to deenergize the relay 1TCP so that such relay is restored to its normally deenergized position. It will be noted that the relays 1TC and 1TCP are both effective when in their dropped away positions to open the code operating portion of the circuit for relay 1CP at front contacts 157 and 158 respectively so that this relay 1CP continues to be inactive subsequent to the closure of back contact 152 of the track relay 1TR. It will be noted that the code oscillators 75CT and 180CT at field station No. 2 are rendered inactive when the relays TC for both coded track circuits terminating at that field station are in their deenergized positions.

Having thus described specifically conditions for shutting down the coded track circuit apparatus automatically subsequent to the passage of a train under a typical operation condition, it is to be understood that a similar mode of operation is provided for both the block between passing sidings and for the siding sections for other train movements, and for train movements in the opposite direction, the system being symmetrical in its organization for governing the respective directions of traffic.

*Indications*

It is to be understood that the usual switch and signal indications are provided in a conventional manner, and in addition track occupancy indicator lamps are provided for the respective blocks and siding sections as is indicated in Fig. 1. Thus, according to Fig. 1, the block lamp A—BE is provided for indicating occupancy in the block between the passing sidings A and B, and the block lamp BE is provided for indicating track occupancy for the siding section of the main track that extends parallel to the passing siding B.

It is to be understood that the means that is conventionally employed in CTC systems can be used for the communication of these indications such, for example, as the means shown specifically in the above mentioned Hailes et al. patent. The initiation of such a system for the transmission of an indication cycle is rendered effective by opening the stick circuit of a normally energized change relay at each field station whenever there is a change in the condition of any device at that field station which is to be indicated at the control office. The dropping away of the change relay in this manner initiates transmission from the associated field station to the control office. Thus a stick circuit for a change relay can be organized as illustrated in Fig. 4 for the stick circuit of relay $CH^2$ which is assumed to be provided at field station No. 2 for governing the initiation of the transmission of an indication cycle from that field station. The stick circuit for the relay $CH^2$ can be considered as typical of the stick circuit provided for corresponding relays at each of the other field stations that is included in the system. The normally energized change relay $CH^2$ when deenergized is maintained deenergized until an indication cycle is initiated from that field station, and it is restored to its normally energized condition by the momentary energization during the cycle of its pick up circuit (not shown).

With reference to Fig. 4 a change in the condition of either of the correspondence relays NCR or RCR which are associated with the track switch 2W is effective to interrupt the stick circuit of the relay $CH^2$ in an obvious manner, and also a change in the condition of either of the red repeater relays 1RP or 2RP for the signals 1 and 2 respectively is effective to initiate an indication cycle by interrupting the stick circuit.

When coding is initiated in the track section 1T by the feeding of steady energy to the right-hand end of that track section, the relay 1TC is picked up in response to the steady energization in a manner which has been described, and with reference to Fig. 4, the shifting of contact 195 of that relay interrupts the stick circuit for the relay $CH^2$ to initiate the transmission of an indication cycle to the office for indicating the new position of the relay 1TC. Similarly when westbound traffic is set up through the block between the passing sidings A and B the relay 2TC is picked up by steady energization applied to the track section 2—3T, and the shifting of contact 196 of that relay under such conditions is effective to initiate the transmission of an indication cycle by interrupting the stick circuit for the change relay $CH^2$. It will be readily apparent that the restoration of the relays 1TC and 2TC is effective in each case to initiate an indication cycle when the shutting down of the track circuit coding is rendered effective by the transmission of steady energy through the track rails in a manner which has been described.

By the inclusion of the front-back contact 197 of relay 1H in multiple with the front and back contacts 198 and 199 of relays 1TZP and 1BS respectively in the stick circuit for the relay $CH^2$, a circuit organization is provided that will initiate the transmission of an indication to the office for block indication, only when the track section 1T has become occupied or unoccupied by the passage of a westbound train, irrespective of the picking up and dropping away of the relay 1H when coding is respectively initiated and shut down.

To consider the mode of operation involved in this circuit combination, it will be noted that the relay 1TZP is picked up during the shutting down of coding in the track section 1T when it is set up for westbound traffic, and thus the front contact 198 of this relay is effective to shunt the contact 197 of relay 1H at the time the relay 1H is dropped away during the shutting down of the coding in the track section 1T so that no indication cycle is initiated by this operation of the relay 1H. The relay 1BS is picked up in response to the picking up of relay 1H so the back contact 199 of relay 1BS is closed at the time when the relay 1H is initially picked up in setting up a route, thus providing that the picking up of relay 1H when a route is set up is not effective to initiate the transmission of an indication cycle. Because of the relay 1BS being maintained picked up by its stick circuit until track circuit coding in the track section 1T is shut down, its back contact 199 is maintained open during the passage of a train, and also the front contact 198 of relay 1TZP is open at this time because that relay is picked up only during initiation and shut down operations. It is therefore provided that the contact 197 of relay 1H is uncovered after establishment of a route so that the entrance of a train into the track section 1T is effective to initiate the transmission of an indication cycle from the field station No. 2. When the track section 1T becomes unoccupied in the rear of a train, the picking up of relay 1H in response to the track circuit code is again effective to interrupt the circuit for the change relay $CH^2$ so as to initiate the transmission of an indication cycle from field station No. 2.

Similarly the circuit combination of contacts 200, 201 and 202 of relays 1—2D, 2BS and 2TZP is effective to govern initiation of the communication apparatus at field station No. 2 for the transmission of an indication cycle when the block between the passing sidings A and B becomes respectively occupied and unoccupied upon passage of a train. It will be noted that the contact 200 of relay 1—2D is used in this circuit combination as compared to the contact 197 of relay 1H in the circuit combination that has been described as being associated with the siding section 1T, as the picking up of this relay 1—2D is indicative of the entire block between the passing sidings A and B being unoccupied. This is true, because the relay 1—2D requires a 180 code rate for its energization, and such code can be applied only when the entire block is unoccupied by a train. It will be readily apparent that if more than two coded track circuits are to be provided within the block, that a third distinctive code rate may be employed as a means for indicating when the entire block is unoccupied.

The indication determining relay contacts that are used for determining the respective indications that are transmitted from field station No. 2 whenever an indication cycle is initiated are shown in Fig. 4 directly below initiation contacts on corresponding relays, these indication determining contacts being assumed to act upon the system to govern the code characters that are transmitted during an indication cycle in a manner comparable to that fully disclosed in the above mentioned Hailes et al. patent. Thus the closure of front contact 203 of relay NCR during an indication cycle transmits a character indicating that the track switch 2W is in normal correspondence position, and similarly the front contact 204 of relay 2RCR when closed selects a character for transmission indicating that the track switch 2W is in reverse correspondence position. The closure of front contacts 205 and 206 of relays 1RP and 2RP during an indication cycle indicates that the signals 1 and 2 are respectively at stop, and the closure of back contacts 207 and 208 of relays 1TC and 2TC respectively indicates that the track circuit coders are inactive for respective east and west bound traffic for the track section 1T and for the track sections of the block between the passing sidings A and B respectively.

The circuit group comprising front contacts 209 and 210 of relays 1H and 1TZP and back contact 211 of relay 1BS in multiple, provides that the particular indication channel with which this circuit group is associated is closed to indicate that the track section 1T is unoccupied except when the relay 1H is dropped away to open its front contact 209 whenever the track section 1T becomes occupied by a train when a route through the track section 1T is set up for westbound traffic. Similarly the front contacts 212 and 213 of relays 1—2D and 2TZP in multiple with the back contact 214 of relay 2BS are effective to select the transmission of an indication character in accordance with the condition of occupancy of the block between the passing sidings A and B. If this block is occupied by a train in a route established for eastbound traffic, these contacts are all opened, and a character is transmitted by the code communication apparatus during an indication cycle corresponding to the condition of occupancy because of all three contacts of this circuit group being opened. When the block between the passing sidings A and B becomes unoccupied in the rear of an eastbound train, the picking up of relay 1—2D is effective by the closure of its front contact to select a distinctive character for transmission during an indication cycle as a means for indicating at the control office that the block has become unoccupied in the rear of the train. The inclusion of the contacts of the relays BC and TZP in multiple with the contacts of the relays H and D prevents the transmission of an erroneous occupancy indication under conditions where an indication cycle is initiated during the shutting down of the system, as might be the case when shut down is initiated by manual restoration from the control office.

Considering the reception of block indications at the control office, it will be noted that the block indicator lamps A—BE and BE (see Fig. 1) are normally deenergized in accordance with their magnetic stick block indication control relays 2EBK, 3WBK, and 3EBK, and 4WBK being normally actuated to their dropped away positions because of the reception of indication characters from the respective field stations that the respective blocks are unoccupied. A condition of occupancy as defined according to the circuits of Fig. 4 by the opening of front contact 212 of relay 1—2D upon entrance of an eastbound train into the block between the passing siding A and B is transmitted to the office when the train enters the block. This indication is effective to pick up the relay 2EBK (see Fig. 1), and the picking up of this relay is effective by the closure of its front contact 215 to energize the block indicator lamp A—BE. This lamp remains energized as long as there is an eastbound train within the block between the passing sidings A and B, and when this block becomes unoccupied in the rear of the train, an indication is transmitted to the office as has been described which is effective to restore the magnetic stick relay 2EBK to its dropped away position and extinguish the lamp A—BE by the opening of front contact 215. If traffic is set up in the opposite direction for the block between the passing sidings A and B, the relay 3WBK that is controlled from field station No. 3 is picked up in response to occupancy of the block by a westbound train to close its front contact 216 and thus apply energy to the lamp A—BE. The mode of operation and the control of the relay 3WBK under these conditions corresponds to the mode of operation that has been described in connection with the control of the magnetic stick relay 2EBK that is associated with block indication for the passage of eastbound trains through the corresponding block.

It is believed that it should be readily apparent that a similar mode of operation is employed in the control of the indicator lamp BE that indicates occupancy for the siding section associated with the passing siding B, the transmission of indications for the control of this lamp being accomplished in a manner corresponding to that which has been described with reference to Fig. 4 for the transmission of occupancy indication due to presence of a train in the track section 1T that is associated with the passing siding A.

Having thus described a normally shut down coded track circuit CTC system for a typical portion of trackway as a specific embodiment of the present invention, it is desired to be understood that this form has been selected primarily to facilitate the disclosure of the invention rather than to limit the number of forms which the invention may assume, and it is to be further understood that various adaptations, alterations, and modifications may be applied to the specific form shown to meet the requirements of practice without in any manner departing from the spirit or scope of the present invention except as limited by the appending claims.

What I claim is:

1. In a centralized traffic control system for railroads having a code communication system for communicating signal controls from a control office to each of a plurality of field stations of which the adjoining stations are connected by coded track circuits, track circuit code control means at a given one of said field stations comprising in combination, a signal control stick relay for a given signal having a pick-up circuit governed from the control office and having a stick circuit interrupted upon passage of a train, a traffic direction relay controlled from the control office, electro-responsive means effective when said traffic direction relay is dropped away and said signal control relay is picked up to apply steady energy to the track rails for initiation of track circuit code transmission at the next station in advance of said signal, said electro-responsive means being effective to remove said steady energy from the track rails in response to the picking up of said traffic direction relay upon reception of a particular control from the control office, said electro-responsive means being effective when said traffic direction relay is picked up and said stick relay is dropped away to apply steady energy to the track rails if there is no train between said signal and the next station in advance for shutting down the transmission of track circuit code from said station in advance in the direction of said signal, and said electro-responsive means being effective to remove steady energy from the track rails in advance of said signal upon reception of a control from the control office effecting the dropping way of said traffic direction relay when said signal control relay is dropped away.

2. In a centralized traffic control system for railroads having a code communication system for communicating signal and track circuit controls from a control office to each of a plurality of field stations of which the adjoining stations are connected by normally inactive coded track circuits, track circuit code initiating apparatus at a field station for initiating track circuit coding to govern a particular signal comprising in combination, a signal control stick relay for said signal having a pick-up circuit governed from the control office, a traffic direction relay having a pick-up circuit energized in response to the transmission of a control from the control office, electro-responsive means effective when said traffic direction relay is dropped away and said signal control relay is picked up to apply steady energy to the track rails in advance of said signal for initiating track circuit code transmission at the next field station in advance of said signal, said electro-responsive means being effective to remove said steady energy and thus permit the transmission of track circuit code toward said signal from the next field station in advance in response to the picking up of said traffic direction relay upon the reception of a control from the control office.

3. A centralized traffic control system for railroads having a normally at rest code communication system for communicating signal and track circuit controls from a control office to each of two adjoining field stations which are connected by normally inactive coded track circuits comprising in combination, electro-responsive means at the control office provided for each station and responsive to manual designation to initiate a control cycle for transmission of selected signal and track circuit controls to the corresponding field stations, electro-responsive means at each field station responsive to signal and track circuit controls transmitted from the control office during the same control cycle for applying steady energy to the track rails to feed toward the next adjoining field station, normally at rest indication code transmitting means at each field station set into operation for the transmission of an indication control in response to the reception of steady energy through the track rails from the adjoining station, automatic initiating means at the control for each field station acting in response to the reception of said indication control from the adjoining station for rendering said electro-responsive means at the control office active to initiate a control cycle for transmission to the associated field station, said automatic initiating means being effective to select a control for transmission during that cycle for removing steady energy from the track rails, and track circuit code initiating means at each station effective to render a track circuit code transmitter active at that field station in response to the removal of steady energization which has been received through the track rails, only provided that said code transmitter has been normally inactive immediately prior to such steady energization.

4. In a centralized traffic control system for railroads having a code communication system wherein track circuit controls and indication controls are respectively communicated between a control office and a plurality of respective field stations, said centralized traffic control system having normally inactive coded track circuits connecting the adjoining field stations, manually operable means at the control office for each field station for designating the initiation of said communication system for the transmission of track circuit controls to that field station, an indication relay at the control office for each field station selectively picked up or dropped away in response to the reception of a selected one of two indication controls communicated from the associated field station, a normally deenergized change relay at the control office for each of the field stations effective when energized to cause the transmission of a control cycle for that field station, a slow acting indication repeater stick relay at the control office associated with said indication relay for each field station, circuit means for energizing said change relay either in response to said manually operable means, in response to said indication relay for an adjoining station being picked up and its associated indication repeater relay being dropped away, or in response to said indication relay for an adjoining station being dropped away and its associated repeater relay being picked up, and circuit means for energizing said stick repeater relay for one field station in response to the picking up of said change relay for an adjoining station provided that said indication relay for said one field station is picked up, and stick circuit means for each of said stick indication repeater relays for maintaining that relay energized when picked up dependent upon its associated indication relay being picked up, irrespective of the condition of said change relay for the adjoining station.

5. A centralized traffic control system for railroads having a normally at rest code communication system for communicating signal and track circuit codes from a control office to each of several adjoining field stations and for communicating indication controls from each of the field stations to the control office, said centralized traffic control system comprising at the control office, a normally deenergized start relay for each field station effective when energized to set said communication system into operation to transmit selected controls to the associated field station, manually operable means for energizing said start relay and thereby initiating a cycle of operation of said code communication system, a two position magnetic stick indication relay for each field station subject to actuation upon reception of indication controls communicated from the associated field station during an indication cycle of operation of said code communication system, a slow acting indication repeater relay associated with said indication relay for each station, circuit means for energizing said repeater relay when its associated indication relay is actuated to one position and said start relay for an adjoining station is energized, said circuit means being effective to maintain said repeater relay picked up until its associated magnetic stick relay is actuated to its other position, and circuit means governed by said magnetic stick indication relay and its associated repeater relay for a given field station for momentarily energizing said start relay for an adjoining station in response to said magnetic stick relay shifting from either of its positions to the other position, thereby automatically setting said communication system into operation for the transmission of selected controls to the station for which that start relay is provided.

6. In a centralized traffic control system for railroads having a control office connected by a code communication system with two respective field stations which in turn are connected by normally inactive coded track circuits, normally inactive track circuit code transmitting means at each of the stations effective when rendered active to selectively transmit either steady energy or energy at a selected code rate, code initiating means at each field station effective to render said track circuit code transmitting means active to apply steady energy to the track circuits upon the reception of a signal control at that station from the control office for rendering active said track circuit code transmitting means at the other station for the transmission of a track circuit code, code shut down means at each field station effective only upon the reception of energy at a particular code rate through the track rails for rendering said track circuit code transmitting means active to apply steady energy to the track rails to render said track circuit code transmitting means inactive at the other station, and means at each field station governed automatically by indications communicated from the other station through the control office by said code communication system for rendering said track circuit code transmitting means inactive so as to terminate a condition of steady energization of the track rails at that station.

7. A centralized traffic control system having a control office connected by a code communication system with two respective field stations, said field stations being connected by normally inactive coded track circuits, comprising in combination, normally inactive track circuit code transmitting means at each of the field stations, code initiating means at each field station effective to cause said transmitting means to apply steady energy to the track circuits upon the reception of a signal control communicated from the control office for rendering said track circuit code transmitting means active at the other station, code shut down means at each field station effective only upon the reception of energy through the track rails at a particular code rate for applying steady energy to the track rails for rendering said track circuit code transmitting means inactive at the other station, indication transmitting means at each of the field stations effective to transmit an indication to the control office whenever steady energy is received through the track rails at that station, and means at the control office effective automatically to transmit a selected control to one of the field stations upon the reception of an indication from the other field station that steady energy has been received.

8. A centralized traffic control system connecting a control office with two respective field stations, the field stations being connected by coded track circuits, comprising in combination, normally inactive track circuit code transmitting apparatus at each of the field stations effective when rendered active to apply selectively steady energy or track circuit code pulses at a selected rate to the coded track circuits, means at each of the field stations for rendering said code transmitting apparatus active to apply steady energy to the track rails, such means being effective either in response to the reception of a signal control transmitted from the control office or in response to the reception of energy at a particular code rate transmitted through the track rails, indication transmitting means at each of the field stations effective to transmit a distinctive indication to the control office whenever steady energy is received through the track rails at that field station, and means at the control office automatically effective in response to an indication received from either field station of the reception of steady energy at that field station for transmitting a control to the other field station to terminate the condition of steady energization of the track rails by rendering said transmitting apparatus inactive.

9. A centralized traffic control system for railroads having a code communication system connecting a control office with two field stations, said field stations being connected by coded track circuits, comprising in combination, normally inactive track circuit code transmitting apparatus at each of the field stations, circuit means at each of the field stations responsive to a control communicated from the control office for causing said track circuit code transmitting apparatus to distinctively energize said track circuits, initiating means at each of the field stations for rendering said code transmitting apparatus active for code transmission at that station in accordance with the reception of said distinctive energization through said track circuits from the other station, shut down means at each of the field stations for rendering said transmitting apparatus at that station effective in response to reception of track code at a particular rate to apply steady energy to said coded track circuits for rendering the code transmitting apparatus at the other station inactive, said shut down means being effective upon reception of steady energy through the track circuits at either station to cause the transmission of an indication via said code communication system automatically through the control office to the other field station and effect the termination of steady energization of the track rails by rendering said transmitting apparatus inactive at that other station.

10. A centralized traffic control system for railroads having a control office connected by a code communication system with two field stations, said field stations being connected by coded track circuits, comprising in combination, normally inactive track circuit code transmitting means at each field station operable when rendered active to transmit a selected one of a plurality of distinctive characters of energization through said coded track circuits to the other field station, initiating means for said transmitting means at each station responsive to a control communicated from the control office for transmitting a distinctive character through the coded track circuits to the other station to initiate said code transmitting means at that other station, shut down means rendered active at one station upon the reception of a series of code characters at a particular rate transmitted through the track rails for causing said code transmitting means to apply steady energy to the track rails as a means for buckling down the code transmitted in the other direction and rendering said code transmitting means inactive at the other station, said shut down means being effective upon reception of steady energy fed through the track circuits from the other station to cause the removal of such steady energy by transmission of an indication control to such other station via said code communication system automatically through said control office.

THOMAS J. JUDGE.

References Cited in the file of this patent

UNITED STATES PATENTS

| Number | Name | Date |
|---|---|---|
| Re. 22,780 | Van Horn | Aug. 13, 1946 |
| 2,353,421 | Staples | July 11, 1944 |